United States Patent
Ochiai et al.

(10) Patent No.: US 6,369,479 B1
(45) Date of Patent: *Apr. 9, 2002

(54) HYBRID-TYPE MAGNET AND STEPPING MOTOR INCLUDING SAME

(75) Inventors: Yasuzumi Ochiai, Kanagawa; Yoshitake Nishi, Tokyo; Kazuya Oguri, Kanagawa; Sanshiro Ogino, Tokyo; Hiroyuki Makabe, Kanagawa, all of (JP)

(73) Assignee: Genesis Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,680

(22) Filed: Jan. 26, 1999

(30) Foreign Application Priority Data

Jan. 27, 1998 (JP) .......................... 10-027884
Nov. 11, 1998 (JP) .......................... 10-321044

(51) Int. Cl.$^7$ .............................................. H02K 21/12
(52) U.S. Cl. ..................... 310/156.51; 310/12; 310/181; 310/184; 310/152
(58) Field of Search .................... 310/12, 156, 181, 310/184

(56) References Cited

U.S. PATENT DOCUMENTS

| | | |
|---|---|---|
| 2,128,044 A | 8/1938 | Grabner |
| 3,604,959 A | 9/1971 | Sturman ....................... 310/12 |
| 3,999,107 A | 12/1976 | Reuting ....................... 318/135 |
| 4,048,531 A | 9/1977 | Buess et al. .................. 310/49 |
| 4,370,577 A * | 1/1983 | Wakabayashi et al. ........ 310/12 |
| 4,563,602 A * | 1/1986 | Nagasaka .................... 310/12 |
| 4,672,247 A * | 6/1987 | Madsen et al. ........... 310/49 R |

(List continued on next page.)

FOREIGN PATENT DOCUMENTS

| | | | |
|---|---|---|---|
| FR | 2031901 | 11/1970 | |
| FR | 2682542 | 4/1993 | .................... 33/16 |

OTHER PUBLICATIONS

Patent Abstracts of Japan vol. 010, No. 319 (E–450), Oct. 30, 1986 & JP 61 128761 A (Ishikawajima Harima Heavy Ind. Co. Ltd. Jun. 16, 1986.
Akopian, et al., "A tetrodotoxin–resistant voltage–gated sodium channel expressed by sensory neurons," *Nature* 379;257–262 (1996).
Akopian, et al., "R. norvegicus mRNA for voltage–gated sodium channel (SNS)," *Embl. Sequence Database*(Feb. 29, 1996).
Akopien, et al., "Rattus norvegicus voltage–gated sodium channel," *Embl Sequence Database*(Nov. 1, 1996).
Chen, "Molecular cloning of a tetrodotoxin–resistant sodium channel alpha–1 subunit from dog nodose ganglion Neurons," *Biophysical Journal* 72:A363 (1997).

(List continued on next page.)

*Primary Examiner*—Elvin Enad
(74) *Attorney, Agent, or Firm*—Lerner, David, Littenberg, Krumholz & Mentlik, LLP

(57) ABSTRACT

A hybrid-type magnet includes an electromagnet having a U-shaped core made of a magnetic material. The core includes a core body having outer ends and a pair of opposing arms extending upwardly from the outer ends of the core body, wherein each opposing arm includes an upper end having an end surface. An excitation coil is wound on the core. The hybrid-type magnet also includes a bar-like engagement member including a permanent magnet having a direction of magnetization, the permanent magnet being disposed between magnetic members. The magnetic members are closely joined to the respective end surfaces of the arms, the permanent magnet being positioned between the arms of the core, whereby the end surfaces of the opposing arms extend in a direction substantially parallel to the direction of magnetization of the permanent magnet.

24 Claims, 18 Drawing Sheets

U.S. PATENT DOCUMENTS

| | | | |
|---|---|---|---|
| 4,713,570 A | | 12/1987 | Mastromattei ............... 310/154 |
| 4,755,703 A | | 7/1988 | Ueno .......................... 310/184 |
| 4,758,756 A | | 7/1988 | Pouillange .................. 310/152 |
| 4,810,914 A | * | 3/1989 | Karidis et al. ................ 310/12 |
| 4,857,782 A | * | 8/1989 | Tokio et al. ................... 310/12 |
| 4,908,533 A | | 3/1990 | Karita et al. .................. 310/12 |
| 4,945,268 A | | 7/1990 | Nehei et al. .................. 310/12 |
| 4,983,867 A | * | 1/1991 | Sakamoto ................. 310/49 R |
| 5,081,388 A | | 1/1992 | Chen .......................... 310/266 |
| 5,124,598 A | | 6/1992 | Kawamura ................... 310/30 |
| 5,132,581 A | | 7/1992 | Kusase ....................... 310/263 |
| 5,208,498 A | | 5/1993 | Hamajima .................... 310/12 |
| 5,218,250 A | | 6/1993 | Nakagawa ................... 310/12 |
| 5,292,284 A | | 3/1994 | Denk et al. ................... 464/29 |
| 5,315,190 A | | 5/1994 | Nasar .......................... 310/12 |
| 5,345,131 A | | 9/1994 | Torok ......................... 310/181 |
| 5,434,459 A | | 7/1995 | Pinkerton .................... 310/20 |
| 5,463,263 A | | 10/1995 | Flynn ......................... 310/181 |
| 5,528,090 A | | 6/1996 | Satomi ........................ 310/12 |
| 5,552,651 A | | 9/1996 | Radomski .................. 310/181 |
| 5,552,653 A | | 9/1996 | Nose .......................... 310/263 |
| 5,554,903 A | | 9/1996 | Takara ........................ 310/266 |
| 5,585,680 A | | 12/1996 | Vladimir Tsoffka .......... 310/49 |
| 5,650,682 A | | 7/1997 | Smart ......................... 310/181 |
| 5,804,901 A | | 9/1998 | Ogino et al. ................ 310/152 |
| 5,834,865 A | * | 11/1998 | Sugiura .................... 310/49 R |
| 5,886,142 A | | 3/1999 | Ogino et al. ................ 310/181 |

OTHER PUBLICATIONS

Chen, et al., "Molecular cloning of a putative tetrodotoxin–resistant sodium channel from dog nodose ganglion neurons," *Gene* 202:7–14 (1997).

Sangameswaran, et al., "Structure and function of a novel voltage–gated, tetodotoxin–gated, sodium channel specific to sensory neurons," *Journal of Biological Chemistry* 271:5953–5956 (1996).

Sangameswaran, et al., "Rattus norvegicus sodium channel PN3 gene, colplete cds.," *Embl. Sequence Database* (Apr. 26, 1996).

Sangameswaren, et al., "Rattus norvegius sodium channel, PN3," *Embl. Sequence Database 1* (Nov. 1, 1996).

* cited by examiner

FIG. 21A FIG. 21B
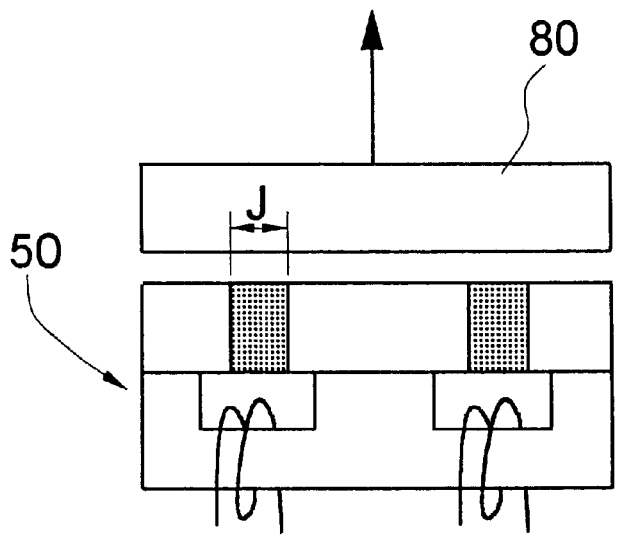 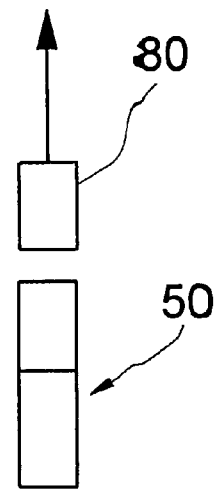
FIG. 22A FIG. 22B
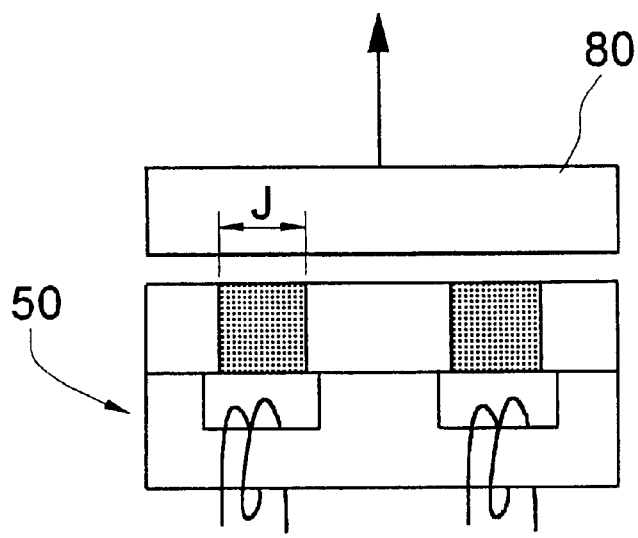 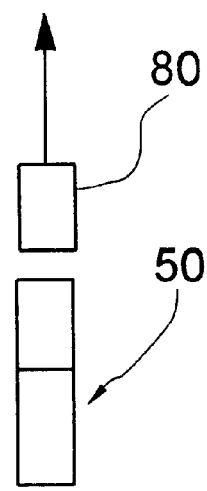

FIG. 23A  FIG. 23B
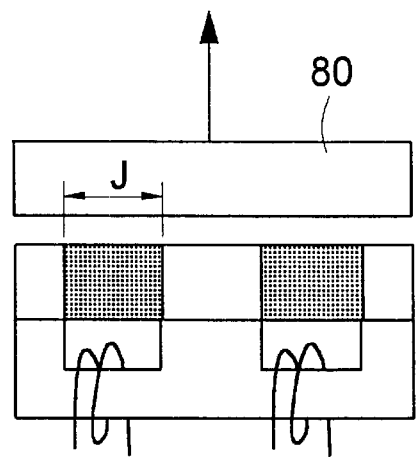 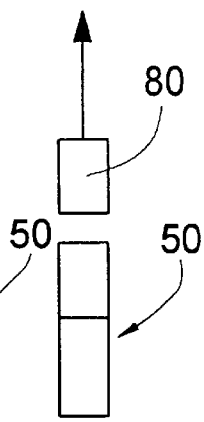
FIG. 24A  FIG. 24B
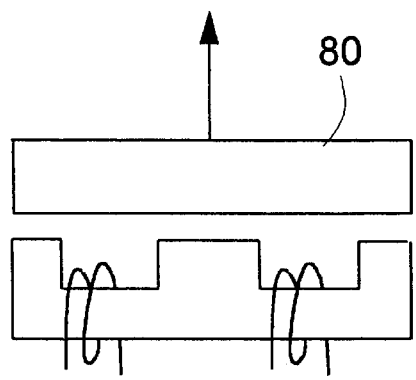 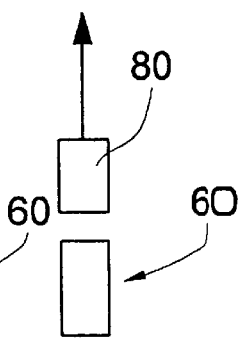
FIG. 25A  FIG. 25B
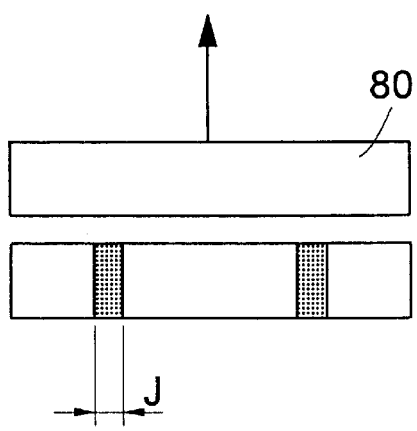 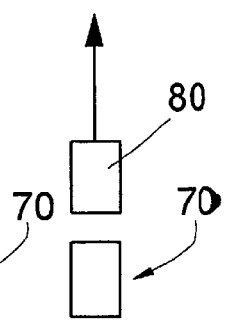

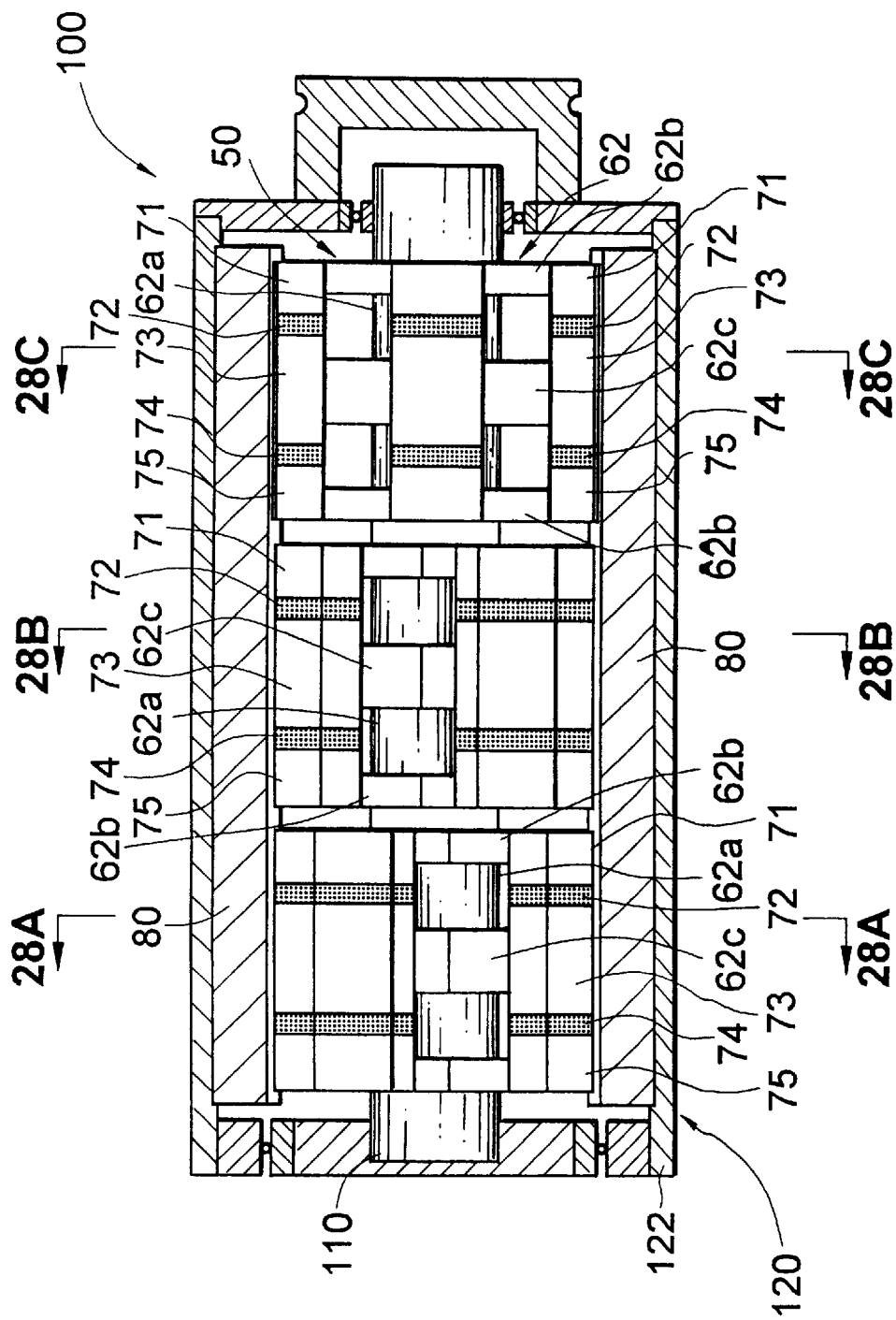

HYBRID-TYPE MAGNET AND STEPPING MOTOR INCLUDING SAME

BACKGROUND OF THE INVENTION

This invention relates to a hybrid-type magnet and a stepping motor including the same, and more particularly to a hybrid-type magnet wherein a permanent magnet and an electromagnet are combined with each other to control a current fed to the electromagnet, to thereby control intensity of a magnetic field affecting an exterior of the hybrid-type magnet and generate energy increased in amount as compared with energy fed thereto.

There have been conventionally developed few magnets constituted by a combination of a permanent magnet and an electromagnet. It is generally considered that a combination of a permanent magnet and an electromagnet exhibits a function of generating a sum of a magnetic field of the permanent magnet and that of the electromagnet when a current is flowed through an excitation coil of the electromagnet in a certain direction. Also, it is considered that the combination, when a current in a direction opposite to the above-described direction is flowed through the excitation coil, causes a magnetic field of the permanent magnet to be canceled by a magnetic field in an opposite direction generated by the electromagnet.

Thus, when the excitation coil does not have a current flowed therethrough, only the permanent magnet generates a magnetic field. Flowing of a current through the excitation coil leads to an increase or decrease in magnetic.

However, such a combination of the permanent magnet and electromagnet as described above fails to effectively utilize energy of the permanent magnet. Energy of the permanent magnet is apparently utilized, however, it is required to feed energy to the electromagnet for canceling the magnetic field, resulting in the balance between energy utilized and that fed being zero. Thus, in order to ensure that energy of the permanent magnet is effectively utilized by excitation of the electromagnet, it is required to view the combination from a different angle.

SUMMARY OF THE INVENTION

The present invention has been made in view of the foregoing problem of the prior art.

Accordingly, it is an object of the present invention to provide a hybrid-type magnet which is capable of effectively utilizing energy of a permanent magnet by excitation of an electromagnet.

It is another object of the present invention to provide a stepping motor having such hybrid-type magnets as described above incorporated therein.

In accordance with one aspect of the present invention, a hybrid-type magnet is provided. The hybrid-type magnet generally includes an electromagnet and a bar-like engagement member. The electromagnet includes a core made of a magnetic material and formed of a core body and a pair of opposite arms to have a U-shape and an excitation coil wound on the core. The bar-like engagement member includes a permanent magnet and magnetic members arranged so as to interpose the permanent magnet therebetween and is closely joined to outer ends of the arms while being extended between the outer ends of the arms. The permanent magnet is positioned between the arms of the core.

In a preferred embodiment of the present invention, the permanent magnet and magnetic members of the engagement member each have a cross section formed to have a rectangular shape and identical dimensions.

In a preferred embodiment of the present invention, each of the arms of the core has an outer surface defined at a lateral end thereof and the engagement member has end surfaces defined at opposite lateral ends thereof. The outer surface of the arm and one of the end surfaces of the engagement member are formed so as to be flush with each other when the engagement member is closely joined to the core.

In a preferred embodiment of the present invention, the magnetic members of the engagement member each have a saturation magnetic flux density greater than that of the core.

In a preferred embodiment of the present invention, the arms of the core are each formed to have a rectangular shape in cross section.

In a preferred embodiment of the present invention, the engagement member is so constructed that a ratio between a width of the permanent magnet in a direction of magnetization thereof and a sum of widths of the magnetic members is within a range between 1:1 and 1:15.

In a preferred embodiment of the present invention, the core is made of pure iron and the permanent magnet is made of neodymium.

Such construction of the hybrid-type magnet, when the excitation coil of the electromagnet is kept from being fed with a current, permits a line of magnetic force generated by the permanent magnet to form a closed magnetic path passing through the N pole of the permanent magnet, one of the magnetic members, the core, the other of the magnetic members and the S pole of the permanent magnet, to thereby substantially prevent leakage of a magnetic flux to the air. Then, when a current is fed to the excitation coil of the electromagnet to permit the excitation coil to generate a magnetic flux in a direction opposite to the line of magnetic force of the permanent magnet, a line of magnetic force of the permanent magnet is canceled by that of the electromagnet. Also, it is discharged to the air when it exceeds a saturation state of the permanent magnet. At this time, when the amount of magnetic flux of the electromagnet is substantially increased, the amount of magnetic flux discharged to the air corresponds to addition between a magnetic flux of the permanent magnet and that of the electromagnet.

Thus, arrangement of a magnetic element in proximity to the engagement member keeps the hybrid-type magnet from attracting the magnetic element when a current is not flowed through the excitation coil and permits the permanent magnet and electromagnet to cooperate with each other to attract the magnetic element when a current is flowed through the excitation coil. This results in the hybrid-type magnet of the present invention effectively utilizing an action of the permanent magnet free of energy consumption.

Also, in accordance with this aspect, a hybrid-type magnet is provided. The hybrid-type magnet generally includes an electromagnet and a bar-like engagement member. The electromagnet includes a core made of a magnetic material and formed of a pair of core bodies and three arms to have a substantially E-shape and excitation coils wound on the core. The excitation coils are each wound on a corresponding one of the core bodies. The bar-like engagement member includes a first magnetic member, a first permanent magnet, a second magnetic member, a second permanent magnet and a third magnetic member tightly connected to each other in order and is closely joined to the core while being extended between outer ends of outer two arms of the arms of the core. The first and second permanent magnets are each positioned between an adjacent two of the arms.

In a preferred embodiment of the present invention, the permanent magnets and magnetic members of the engagement member each have a cross section formed to have a rectangular shape and identical dimensions.

In a preferred embodiment of the present invention, each of the outer two arms of the arms of the core has an outer surface defined at a lateral end thereof and the engagement member has end surfaces defined at opposite lateral ends thereof. The outer surface of each of the outer two arms of the arms and one of the end surfaces of the engagement member are formed so as to be flush with each other when the engagement member is closely joined to the core.

In a preferred embodiment of the present invention, the magnetic members of the engagement member each have a saturation magnetic flux density greater than that of the core.

In a preferred embodiment of the present invention, the arms of the core are each formed to have a rectangular shape in cross section.

In a preferred embodiment of the present invention, the permanent magnets are formed to have identical widths in a direction of magnetization thereof. The engagement member is so constructed that a ratio between a sum of widths of the permanent magnets and a sum of widths of the magnetic members is within a range between 1:1 to 1:15.

In a preferred embodiment of the present invention, the core is made of pure iron and the permanent magnets are each made of neodymium.

In accordance with another aspect of the present invention, a stepping motor is provided. The stepping motor generally includes a stator and a rotor. The stator includes a plurality of the above-described hybrid-type magnets. The hybrid-type magnets are integrally combined together and arranged in such a manner that the arms are radially extended and spaced from each other at equal angular intervals around a single common core body of the cores of the hybrid-type magnets. The rotor includes magnetic members arranged at equal angular intervals outside the engagement members of the hybrid-type magnets.

In a preferred embodiment of the present invention, a plurality of the stepping motors are arranged at a predetermined phase difference while being connected in series to each other.

Such construction of the stepping motor permits energy increased in amount compared with that fed to the electromagnet to be outputted therefrom by means of the permanent magnet by flowing a pulse current through each of the excitation coils.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIGS. 21A and 21B are a front elevation view and a side elevation view similar to FIGS. 19A and 19B, respectively, wherein the permanent magnet is formed to have a width of 10 mm;

FIGS. 22A and 22B are a front elevation view and a side elevation view similar to FIGS. 19A and 19B, respectively, wherein the permanent magnet is formed to have a width of 15 mm;

FIGS. 23A and 23B are a front elevation view and a side elevation view similar to FIGS. 19A and 19B, respectively, wherein the permanent magnet is formed to have a width of 20 mm;

FIGS. 24A and 24B are a front elevation view and a side elevation view showing a manner in which an experiment of separating the movable member from the hybrid-type magnet of FIGS. 19A and 19B is carried out under the condition that the engagement member is detached from the hybrid-type magnet, respectively;

FIGS. 25A and 25B are a front elevation view and a side elevation view showing a manner in which an experiment of separating the movable member from the hybrid-type magnet of FIGS. 19A and 19B is carried out using only the engagement member, respectively;

FIG. 27 is a vertical sectional view showing an embodiment of a stepping motor according to the present invention;

DETAILED DESCRIPTION OF THE PREFERRED EMBODIMENTS

Now, a hybrid-type magnet according to the present invention will be described hereinafter with reference to the accompanying drawings.

Figure 1A:
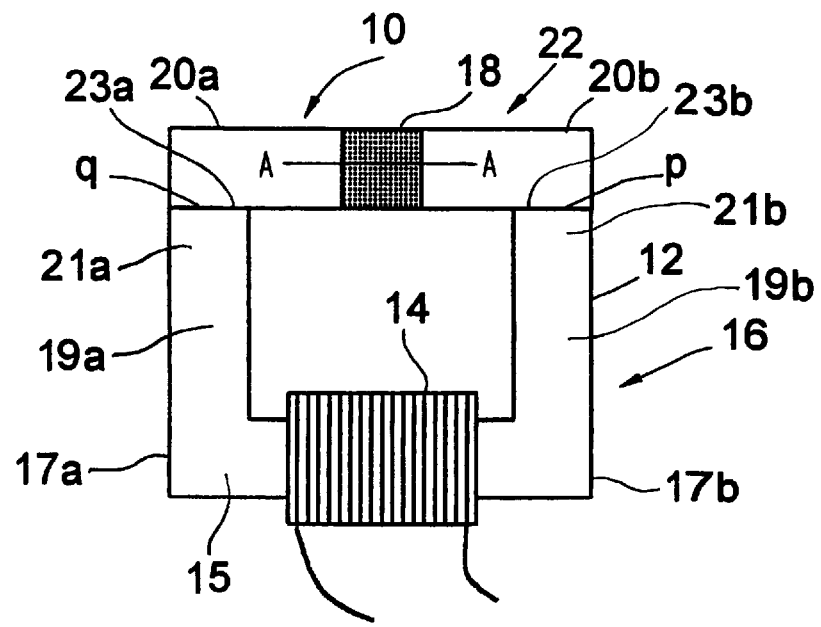
FIG. 1A is a front elevation view showing an embodiment of a hybrid-type magnet according to the present invention.
Figure 1B:
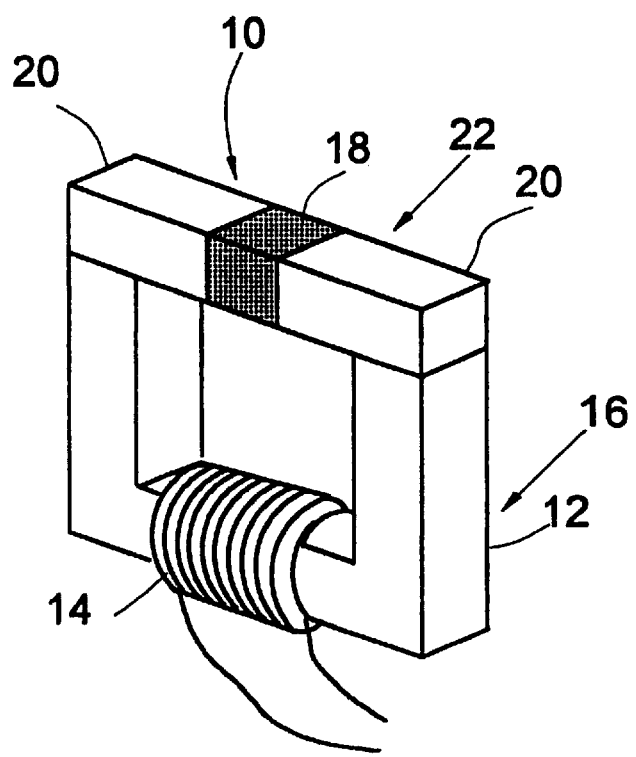
FIG. 1B is a perspective view of the hybrid-type magnet shown in FIG. 1A.

Referring first to FIGS. 1A and 1B, an embodiment of a hybrid-type magnet according to the present invention is illustrated. A hybrid-type magnet of the illustrated embodiment generally designated at reference numeral 10 generally includes two major components. One of the components is an electromagnet 16 which includes a core 12 made of a magnetic material and formed to have a U-shape and an excitation coil 14 wound on the core 12. The other component is a bar-like engagement member 22 which includes a permanent magnet 18 and two magnetic members 20 arranged on opposite sides of the permanent magnet 18 so as to interpose it therebetween and is closely joined to opposite ends of the core 12 so as to be extended over an opening of the core 12. The core 12 includes a core body 15 having outer ends 17a, 17b and opposing arms 19a, 19b desirably extending upwardly from the outer ends 17a, 17b of the core body 15. The respective arms 19a, 19b include upper ends 21a, 21b defining end surfaces 23a, 23b, respectively.

The engagement member 22 is constituted of the permanent magnet 18, which may be a neodymium magnet, and the magnetic materials 20 made of a soft magnetic material and arranged so as to interpose therebetween opposite sides of the permanent magnet 18 defined in a direction of magnetization thereof. The direction of magnetization generally extends in the direction indicated by the Axis designated A—A. The permanent magnet 18 and magnetic members 20 each have a section formed to have the same rectangular shape, resulting in cooperating with each other to form a single bar-like configuration. The magnetic members 20 arranged on the opposite sides of the permanent magnet 18 are formed to have the same length, which is about twice as great as a length or width of the permanent magnet 18 in a direction of magnetization.

The electromagnet 16, as described above, includes the U-shaped core 12, which may be formed by laminating pure iron plates of a soft magnetic material on each other, as well as the excitation coil 14, which may be formed by winding a copper wire on a bottom or core body of the core 12. The core 12 has magnetic permeability set to be lower than that of the magnetic members 20 of the bar-like engagement member 22. The engagement member 22 is closely joined to lateral ends p and q (FIG. 1A) of the U-shaped core 12 on which magnetic poles S and N appear in a manner to be extended therebetween or extended over an opening of the U-shaped core 12 defined between the ends p and q. The magnetic members 20 of the bar-like engagement member 22 each have an end surface formed so as to be flush with an outer surface of a corresponding one of the ends of the core 12. In other words, the magnetic members 20a, 20b are closely joined to the perspective end surfaces 23a, 23b of arms 19a, 19b with the permanent magnet 18 being positioned between the arms 19a, 19b. The end surfaces 23a, 23b of the respective arms 19a, 19b preferably extend in a direction substantially parallel to the direction of magnetization (designated by Axis A—A) of the permanent magnet 18.

Now, characteristics of the hybrid-type magnet 10 of the illustrated embodiment thus constructed will be described.

First of all, when the excitation coil 14 of the electromagnet 16 is kept from being fed with a current, a line of magnetic force generated by the permanent magnet 18 forms a closed magnetic path passing through the N pole of the permanent magnet 18, one of the magnetic members 20, the core 12, the other of the magnetic members 20 and the S pole of the permanent magnet 18, to thereby substantially prevent leakage of a magnetic flux to the air. This permits increased attractive force to be generated at an interface between the core 12 and the engagement member 22 which are closely joined together. Such a state is referred to as "state 1" herein. The interface is defined on each of the ends p and q of the core 12, therefore, it may be also designated at p and q herein.

Then, the excitation coil 14 of the electromagnet 16 is fed with a current which flows in a direction opposite to a direction of the line of magnetic force of the permanent magnet 18 and permits generation of a magnetic flux in an amount increased as compared with a magnetic flux of the permanent magnet 18. This results in the line of magnetic force of the permanent magnet 18 being pushed back above the interface p, q between the core 12 and the engagement member 22 from the closed magnetic path, so that the line of magnetic force may be discharged to the air when it exceeds a saturation state of the permanent magnet 18. At this time, when the amount of magnetic flux of the electromagnet 16 reaches a sufficient level, the amount of magnetic flux discharged to the air corresponds to synthesis between the magnetic flux of the permanent magnet 18 and that of the electromagnet 16. Such a state is referred to as "state 2" herein. Thus, increased attractive force is generated at the interface p, q between the core 12 and the engagement member 22. The attractive force is generated by only the electromagnet 16.

When the excitation coil 14 is fed with a current to permit the electromagnet 16 to generate a magnetic flux in an amount equal to that of the magnetic flux of the permanent magnet 18 and as a result a magnitude of the current is increased as compared with a saturation state of a residual magnetic flux density in the closed magnetic path, neither attraction nor repulsion occurs at the interface p, q between the core 12 and the engagement member 22. Such a state is referred to as "state 3" herein. This indicates that there is no intercommunication or interlinkage between the line of magnetic force of the permanent magnet 18 and that of the electromagnet 16. When the magnetic flux of the permanent magnet 18 and that of the electromagnet 16 are increased in amount to a level exceeding a saturation state of the residual magnetic flux density in the closed magnetic path even when both magnetic fluxes are equal in mount to each other, repulsion force is generated at the interface p, q, so that the lines of magnetic force of both electromagnet 16 and permanent magnet 18 are discharged in the form of a leakage magnetic flux to the air.

Figure 2:
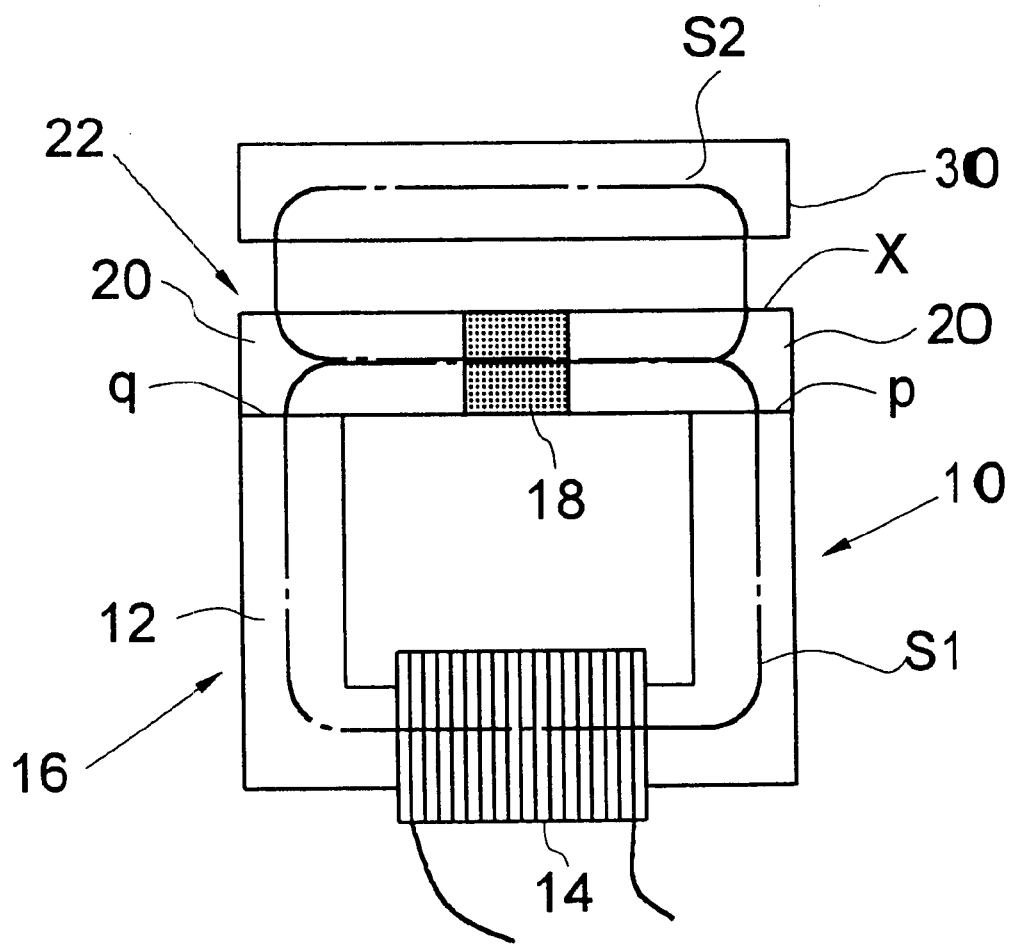
FIG. 2 is a front elevation view showing operation of the hybrid-type magnet of FIGS. 1A and 1B.

Under the conditions that neither attraction nor repulsion occurs at the interface p, q between the core 12 and the engagement member 22 while permitting an outer surface of the engagement member 22 of the hybrid-type magnet 10 to function as an action surface X, a movable member 30 is supposed to be arranged in proximity to the action surface X as shown in FIG. 2. Such a state is referred to as "state 4" herein. The movable member 30 may be made of a soft magnetic material. When a current flowed through the excitation coil 14 is indicated at P and a current flowed through the excitation coil 14 in order to keep both attraction and repulsion from occurring at the interface p, q between the core 12 and the engagement member 22 supposing that the movable member 30 is not present is indicated at P1, the current P is reduced with a decrease in gap between the action surface X and the movable member 30. This indicates that the line of magnetic force of the permanent magnet 18 forms a magnetic path through an air gap with respect to the movable member 30 beyond the interface p, q without forming any closed magnetic path in the hybrid-type magnet, to thereby generate attractive force on the action surface X.

The amount of current P fed to the excitation coil 14 of the electromagnet 16 is reduced to a level merely required to intercept the line of magnetic force of the permanent magnet 18 at the interface p, q between the core 12 and the engagement member 22. Thus, when cooperation of the line of magnetic force of the permanent magnet 18 with the movable member 30 facilitates formation of the magnetic path, the current P is permitted to be reduced. In other words, an increase in attractive force on the action surface X permits the current P to be reduced. It is a matter of course that attractive force on the action surface X is restricted depending on performance of the permanent magnet 18.

When the current P is fed in an increased amount to the excitation coil 14 as in the state 2 described above, attractive force on the action surface X is obtained by synthesis between the line of magnetic force of the permanent magnet 18 and that of the electromagnet 16. Although this leads to an increase in attractive force, it causes a deterioration in energy efficiency.

In order to increase attractive force on the action surface X and decrease the current P in the state 4 described above, the following requirements must be satisfied:

(1) An air gap on the action surface X is reduced;
(2) The movable member 30 and the magnetic members 20 of the engagement member 22 each have a saturation magnetic flux density greater than that of the core 12; and
(3) A closed magnetic path of the hybrid-type magnet has a length S1 set to be smaller than a length S2 of a magnetic path defined by cooperation between the permanent magnet 18 and the movable member 30 through the air gap.

An increase in attractive force on the action surface X of course requires an increase in performance (Br, BH) of the permanent magnet 18. In the illustrated embodiment, a neodymium magnet is used as the permanent magnet 18. Alternatively, a samarium magnet, a magnet of manganese-aluminum alloy or the like may be substituted therefor. Dimensions of each of the permanent magnet 18 and magnetic members 20 are each determined depending on a sectional area of the permanent magnet 18, Br and BH curves thereof, permeance thereof and the like, so that dimensions of the movable member 30 may be determined or selected.

Figure 3:
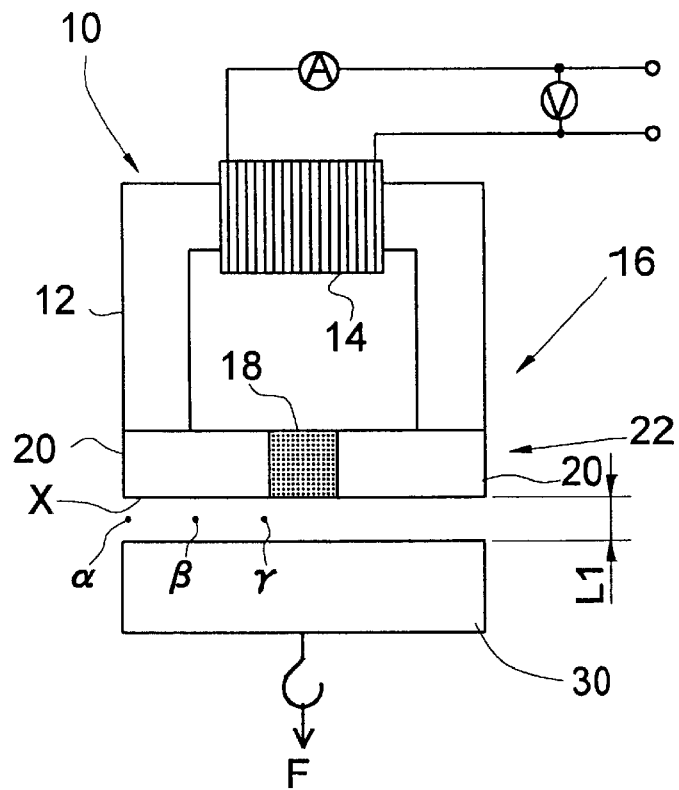
FIG. 3 is a schematic view showing a manner of measurement of attractive force of the hybrid magnet according to the present invention.
Figure 4:
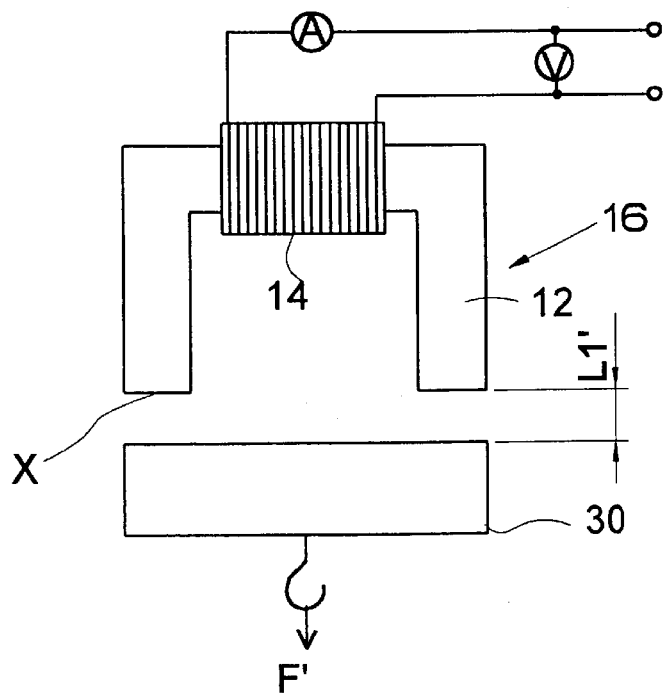
FIG. 4 is a view showing a manner of measurement of attractive force generated by only an electromagnet.

Then, a current is fed to the excitation coil 14 of the hybrid-type magnet 10, to thereby actually measure attractive force with respect to the movable member 30 in such a manner as shown in FIG. 3. In this instance, the permanent magnet 18 may be formed to have dimensions of 35 mm in width, 25 mm in height and 35 mm in depth and the magnetic members 20 and movable member 30 may each be made of a material which permits each of the members 20 and 30 to have a saturation magnetic flux density greater than that of the core 12. Also, for comparison, attractive force is measured using only the electromagnet 16 without arrangement of the engagement member 22, as shown in FIG. 4. Further, in the case of the hybrid-type magnet 10, measurement of a magnetic flux density at each of predetermined positions α,β and γ is carried out as well. In either case, the measurement is executed by means of a spring balance while attaching a hook to the movable member 30 and maintaining the whole measuring system horizontal to permit gravity to be neglected.

Actually, attractive force F (kgf) with respect to the movable member 30 was measured while varying an air gap L1 between the action surface X and the movable member 30 to 0.5, 1, 2, 3, 4, 5, 6, 7, 8, 9 and 10 mm and varying a current flowed through the excitation coil 14. The results are shown in Tables 1 to 11.

TABLE 1

Attractive Force under Varying Current

| L1 (mm) | Current (A) | Voltage (V) | F (kgf) | Magnetic Flux Density (gauss) α | β | γ |
|---|---|---|---|---|---|---|
| 0.5 | 0.4 | 0.180 | 11.5 | — | — | — |
| | 0.8 | 0.356 | 39.0 | — | — | — |
| | 1.2 | 0.533 | — | — | — | — |
| | 1.6 | — | — | — | — | — |
| | 2.0 | — | — | — | — | — |
| | 2.4 | — | — | — | — | — |
| | 2.8 | — | — | — | — | — |
| | 3.2 | — | — | — | — | — |
| | 3.6 | — | — | — | — | — |
| | 4.0 | — | — | — | — | — |
| | 0 | 0 | 1.2 | — | — | — |

TABLE 2

Attractive Force under Varying Current

| L1 (mm) | Current (A) | Voltage (V) | F (kgf) | Magnetic Flux Density (gauss) α | β | γ |
|---|---|---|---|---|---|---|
| 1 | 0.4 | 0.180 | 4.5 | 1730 | 1710 | 1730 |
| | 0.8 | 0.356 | 11.2 | 2970 | 2930 | 2930 |
| | 1.2 | 0.533 | 23.0 | 4320 | 4230 | 4220 |
| | 1.6 | 0.710 | 40.0 | 5530 | 5450 | 5390 |
| | 2.0 | 0.879 | — | 6980 | 6860 | 6810 |
| | 2.4 | — | — | — | — | — |
| | 2.8 | — | — | — | — | — |
| | 3.2 | — | — | — | — | — |
| | 3.6 | — | — | — | — | — |
| | 4.0 | — | — | — | — | — |

TABLE 3

Attractive Force under Varying Current

| L1 (mm) | Current (A) | Voltage (V) | F (kgf) | Magnetic Flux Density (gauss) α | β | γ |
|---|---|---|---|---|---|---|
| 2 | 0.4 | 0.184 | 1.55 | 931 | 939 | 956 |
| | 0.8 | 0.356 | 3.25 | 1555 | 1550 | 1573 |
| | 1.2 | 0.532 | 6.5 | 2196 | 2191 | 2201 |
| | 1.6 | 0.709 | 10.3 | 2798 | 2803 | 2805 |
| | 2.0 | 0.881 | 16.2 | 3454 | 3429 | 3453 |
| | 2.4 | 1.053 | 22.0 | 4140 | 4120 | 4120 |
| | 2.8 | 1.224 | 31.0 | 4820 | 4790 | 4800 |
| | 3.2 | 1.391 | 41.5 | 5480 | 5450 | 5460 |
| | 3.6 | 1.566 | 52.0 | 6130 | 6090 | 6080 |
| | 4.0 | 1.723 | 63.0 | 6760 | 6730 | 6750 |

TABLE 4

Attractive Force under Varying Current

| L1 (mm) | Current (A) | Voltage (V) | F (kgf) | Magnetic Flux Density (gauss) α | β | γ |
|---|---|---|---|---|---|---|
| 3 | 0.4 | 0.181 | 0.9 | 665 | 663 | 675 |
| | 0.8 | 0.359 | 2.0 | 1092 | 1070 | 1081 |
| | 1.2 | 0.547 | 3.3 | 1529 | 1514 | 1512 |
| | 1.6 | 0.714 | 5.4 | 1978 | 1968 | 1974 |
| | 2.0 | 0.871 | 7.9 | 2445 | 2395 | 2408 |
| | 2.4 | 1.047 | 11.2 | 2867 | 2860 | 2835 |
| | 2.8 | 1.223 | 15.0 | 3338 | 3272 | 3353 |
| | 3.2 | 1.392 | 19.0 | 3780 | 3720 | 3725 |
| | 3.6 | 1.552 | 23.0 | 4230 | 4170 | 4170 |
| | 4.0 | 1.745 | 30.0 | 4660 | 4610 | 4610 |

TABLE 5

Attractive Force under Varying Current

| L1 (mm) | Current (A) | Voltage (V) | F (kgf) | Magnetic Flux Density (gauss) α | β | γ |
|---|---|---|---|---|---|---|
| 4 | 0.4 | 0.189 | 0.6 | 534 | 513 | 502 |
| | 0.8 | 0.358 | 1.15 | 840 | 822 | 816 |
| | 1.2 | 0.534 | 2.1 | 1169 | 1154 | 1153 |
| | 1.6 | 0.715 | 3.5 | 1522 | 1492 | 1501 |
| | 2.0 | 0.886 | 4.9 | 1851 | 1817 | 1828 |
| | 2.4 | 1.062 | 6.8 | 2174 | 2159 | 2162 |
| | 2.8 | 1.236 | 9.2 | 2523 | 2485 | 2479 |
| | 3.2 | 1.408 | 11.6 | 2859 | 2825 | 2839 |
| | 3.6 | 1.581 | 14.6 | 3190 | 3159 | 3180 |
| | 4.0 | 1.753 | 18.0 | 3516 | 3491 | 3493 |

TABLE 6

Attractive Force under Varying Current

| L1 (mm) | Current (A) | Voltage (V) | F (kgf) | Magnetic Flux Density (gauss) α | β | γ |
|---|---|---|---|---|---|---|
| 5 | 0.4 | 0.189 | 0.55 | 411 | 411 | 395 |
|  | 0.8 | 0.359 | 0.9 | 669 | 653 | 655 |
|  | 1.2 | 0.538 | 1.45 | 919 | 901 | 908 |
|  | 1.6 | 0.720 | 2.1 | 1224 | 1182 | 1205 |
|  | 2.0 | 0.891 | 3.15 | 1467 | 1472 | 1460 |
|  | 2.4 | 1.068 | 4.4 | 1733 | 1689 | 1735 |
|  | 2.8 | 1.237 | 6.2 | 2002 | 1970 | 2004 |
|  | 3.2 | 1.415 | 7.6 | 2305 | 2227 | 2262 |
|  | 3.6 | 1.586 | 9.4 | 2529 | 2502 | 2535 |
|  | 4.0 | 1.751 | 11.6 | 2769 | 2753 | 2798 |

TABLE 7

Attractive Force under Varying Current

| L1 (mm) | Current (A) | Voltage (V) | F (kgf) | Magnetic Flux Density (gauss) α | β | γ |
|---|---|---|---|---|---|---|
| 6 | 0.4 | 0.189 | 0.5 | 375 | 360 | 346 |
|  | 0.8 | 0.359 | 0.8 | 561 | 553 | 546 |
|  | 1.2 | 0.528 | 1.2 | 799 | 767 | 772 |
|  | 1.6 | 0.716 | 1.7 | 1035 | 1006 | 1015 |
|  | 2.0 | 0.891 | 2.4 | 1254 | 1218 | 1249 |
|  | 2.4 | 1.068 | 3.4 | 1448 | 1440 | 1465 |
|  | 2.8 | 1.237 | 4.4 | 1680 | 1649 | 1698 |
|  | 3.2 | 1.409 | 5.5 | 1961 | 1875 | 1957 |
|  | 3.6 | 1.587 | 7.0 | 2187 | 2090 | 2157 |
|  | 4.0 | 1.756 | 8.5 | 2409 | 2290 | 2400 |

TABLE 8

Attractive Force under Varying Current

| L1 (mm) | Current (A) | Voltage (V) | F (kgf) | Magnetic Flux Density (gauss) α | β | γ |
|---|---|---|---|---|---|---|
| 7 | 0.4 | 0.182 | 0.25 | 324 | 314 | 317 |
|  | 0.8 | 0.359 | 0.7 | 502 | 479 | 483 |
|  | 1.2 | 0.538 | 0.9 | 736 | 662 | 675 |
|  | 1.6 | 0.716 | 1.3 | 913 | 857 | 881 |
|  | 2.0 | 0.887 | 1.8 | 1083 | 1042 | 1079 |
|  | 2.4 | 1.068 | 2.5 | 1292 | 1239 | 1277 |
|  | 2.8 | 1.237 | 3.3 | 1462 | 1402 | 1452 |
|  | 3.2 | 1.406 | 4.35 | 1667 | 1598 | 1665 |
|  | 3.6 | 1.583 | 5.4 | 1866 | 1789 | 1825 |
|  | 4.0 | 1.750 | 6.5 | 2035 | 1985 | 2077 |

TABLE 9

Attractive Force under Varying Current

| L1 (mm) | Current (A) | Voltage (V) | F (kgf) | Magnetic Flux Density (gauss) α | β | γ |
|---|---|---|---|---|---|---|
| 8 | 0.4 | 0.182 | 0.25 | 290 | 276 | 286 |
|  | 0.8 | 0.359 | 0.65 | 454 | 419 | 439 |
|  | 1.2 | 0.535 | 0.9 | 609 | 577 | 611 |
|  | 1.6 | 0.718 | 1.35 | 776 | 747 | 775 |
|  | 2.0 | 0.890 | 1.8 | 983 | 903 | 952 |
|  | 2.4 | 1.063 | 2.2 | 1142 | 1078 | 1142 |
|  | 2.8 | 1.237 | 2.7 | 1288 | 1241 | 1282 |
|  | 3.2 | 1.414 | 3.3 | 1486 | 1402 | 1490 |

TABLE 9-continued

Attractive Force under Varying Current

| L1 (mm) | Current (A) | Voltage (V) | F (kgf) | Magnetic Flux Density (gauss) α | β | γ |
|---|---|---|---|---|---|---|
|  | 3.6 | 1.586 | 4.2 | 1623 | 1569 | 1661 |
|  | 4.0 | 1.750 | 4.9 | 1846 | 1724 | 1834 |

TABLE 10

Attractive Force under Varying Current

| L1 (mm) | Current (A) | Voltage (V) | F (kgf) | Magnetic Flux Density (gauss) α | β | γ |
|---|---|---|---|---|---|---|
| 9 | 0.4 | 0.182 | 0.2 | 281 | 250 | 251 |
|  | 0.8 | 0.359 | 0.3 | 387 | 377 | 389 |
|  | 1.2 | 0.538 | 0.65 | 545 | 520 | 541 |
|  | 1.6 | 0.720 | 0.9 | 692 | 661 | 730 |
|  | 2.0 | 0.888 | 1.25 | 863 | 802 | 871 |
|  | 2.4 | 1.061 | 1.7 | 1059 | 957 | 1040 |
|  | 2.8 | 1.234 | 2.15 | 1185 | 1104 | 1189 |
|  | 3.2 | 1.406 | 2.8 | 1323 | 1246 | 1356 |
|  | 3.6 | 1.575 | 3.3 | 1493 | 1394 | 1481 |
|  | 4.0 | 1.750 | 4.1 | 1689 | 1587 | 1711 |

TABLE 11

Attractive Force under Varying Current

| L1 (mm) | Current (A) | Voltage (V) | F (kgf) | Magnetic Flux Density (gauss) α | β | γ |
|---|---|---|---|---|---|---|
| 10 | 0.4 | 0.182 | 0.15 | 243 | 225 | 238 |
|  | 0.8 | 0.362 | 0.3 | 363 | 343 | 363 |
|  | 1.2 | 0.538 | 0.45 | 472 | 460 | 510 |
|  | 1.6 | 0.718 | 0.7 | 631 | 587 | 645 |
|  | 2.0 | 0.887 | 1.0 | 772 | 732 | 814 |
|  | 2.4 | 1.067 | 1.3 | 934 | 851 | 964 |
|  | 2.8 | 1.223 | 1.9 | 1037 | 997 | 1080 |
|  | 3.2 | 1.411 | 2.1 | 1223 | 1132 | 1255 |
|  | 3.6 | 1.583 | 2.6 | 1386 | 1267 | 1418 |
|  | 4.0 | 1.749 | 3.3 | 1538 | 1430 | 1558 |

Table 1 indicates that the air gap L1 of 0.5 mm permitted the attractive force to be rapidly increased with an increase in current, as noted from the fact that the attractive force F was 1.5 kgf at the current of 0.4 A and 39.0 kgf at the current of 0.8 A. Although the attractive force F was as high as 1.2 kgf even at the current of 0 A, this was due to a leakage magnetic flux of the permanent magnet 18. The value is trivial as compared with those obtained by flowing of the current. Also, the magnetic flux density at each of the predetermined positions α, β and γ could not be measured because the air gap L1 was too narrow to permit an instrument for measurement to be inserted thereinto. Further, attractive force obtained at the current at a level above 0.8 A was not measured because it exceeded a limitation of measurement of the spring balance.

Tables 2 to 11 also indicate the results obtained by measuring attractive force with respect to the movable member 30 while varying an air gap L1 between the action surface X and the movable member 30 from 1 mm to 10 mm and varying a current flowed through the excitation coil 14. Measurement of attractive force with respect to the movable member 30 at the current of 0 A could not be measured when the air gap L1 exceeds 1 mm. This indicates that the magnetic flux of the permanent magnet 18 substantially forms a closed magnetic path in the hybrid-type magnet 10, resulting in any leakage magnetic flux being kept from being generated.

Then, attractive force was measured using only the electromagnet 16 without arrangement of the engagement member 22 as shown in FIG. 4. The measurement was executed by varying the air gap L1' between the action surface X and the movable member 30 to 0.5, 1, 2, 3, 4, 5, 6, 7, 8, 9 and 10 mm and varying a current flowed through the excitation coil 14. The results are shown in Tables 12 to 22, wherein attractive force measured is indicated at F' (kgf).

TABLE 12

Attractive Force under Varying Current

| L1' (mm) | Current (A) | Voltage (V) | F' (kgf) | Remarks |
|---|---|---|---|---|
| 0.5 | 0.4 | 0.180 | 3.9 | |
| | 0.8 | 0.356 | 15.0 | |
| | 1.2 | 0.534 | 36.0 | |
| | 1.6 | — | — | |
| | 2.0 | — | — | |
| | 2.4 | — | — | |
| | 2.8 | — | — | |
| | 3.2 | — | — | |
| | 3.6 | — | — | |
| | 4.0 | — | — | |

TABLE 13

Attractive Force under Varying Current

| L1' (mm) | Current (A) | Voltage (V) | F' (kgf) | Remarks |
|---|---|---|---|---|
| 1 | 0.4 | 0.184 | 1.2 | |
| | 0.8 | 0.356 | 4.5 | |
| | 1.2 | 0.533 | 10.8 | |
| | 1.6 | 0.713 | 20.0 | |
| | 2.0 | 0.883 | 31.0 | |
| | 2.4 | — | — | |
| | 2.8 | — | — | |
| | 3.2 | — | — | |
| | 3.6 | — | — | |
| | 4.0 | — | — | |

TABLE 14

Attractive Force under Varying Current

| L1' (mm) | Current (A) | Voltage (V) | F' (kgf) | Remarks |
|---|---|---|---|---|
| 2 | 0.4 | 0.184 | 0.6 | |
| | 0.8 | 0.359 | 1.6 | |
| | 1.2 | 0.533 | 3.3 | |
| | 1.6 | 0.710 | 5.4 | |
| | 2.0 | 0.883 | 9.0 | |
| | 2.4 | 1.058 | 13.0 | |
| | 2.8 | 1.226 | 16.0 | |
| | 3.2 | 1.393 | 21.0 | |
| | 3.6 | 1.563 | 27.0 | |
| | 4.0 | 1.731 | 35.0 | |

TABLE 15

Attractive Force under Varying Current

| L1' (mm) | Current (A) | Voltage (V) | F' (kgf) | Remarks |
|---|---|---|---|---|
| 3 | 0.4 | 0.183 | 0.4 | |
| | 0.8 | 0.358 | 0.9 | |

TABLE 15-continued

Attractive Force under Varying Current

| L1' (mm) | Current (A) | Voltage (V) | F' (kgf) | Remarks |
|---|---|---|---|---|
| | 1.2 | 0.545 | 1.5 | |
| | 1.6 | 0.715 | 2.7 | |
| | 2.0 | 0.884 | 4.2 | |
| | 2.4 | 1.052 | 5.4 | |
| | 2.8 | 1.223 | 7.3 | |
| | 3.2 | 1.393 | 10.0 | |
| | 3.6 | 1.556 | 13.0 | |
| | 4.0 | 1.730 | 16.2 | |

TABLE 16

Attractive Force under Varying Current

| L1' (mm) | Current (A) | Voltage (V) | F' (kgf) | Remarks |
|---|---|---|---|---|
| 4 | 0.4 | 0.182 | 0.2 | |
| | 0.8 | 0.358 | 0.35 | |
| | 1.2 | 0.532 | 0.65 | |
| | 1.6 | 0.715 | 1.2 | |
| | 2.0 | 0.881 | 1.8 | |
| | 2.4 | 1.056 | 2.5 | |
| | 2.8 | 1.224 | 3.6 | |
| | 3.2 | 1.394 | 4.4 | |
| | 3.6 | 1.570 | 5.4 | |
| | 4.0 | 1.735 | 6.2 | |

TABLE 17

Attractive Force under Varying Current

| L1' (mm) | Current (A) | Voltage (V) | F' (kgf) | Remarks |
|---|---|---|---|---|
| 5 | 0.4 | 0.180 | 0.2 | |
| | 0.8 | 0.359 | 0.35 | |
| | 1.2 | 0.543 | 0.65 | |
| | 1.6 | 0.712 | 1.2 | |
| | 2.0 | 0.885 | 1.8 | |
| | 2.4 | 1.053 | 2.5 | |
| | 2.8 | 1.228 | 3.6 | |
| | 3.2 | 1.402 | 4.4 | |
| | 3.6 | 1.571 | 5.4 | |
| | 4.0 | 1.739 | 6.2 | |

TABLE 18

Attractive Force under Varying Current

| L1' (mm) | Current (A) | Voltage (V) | F' (kgf) | Remarks |
|---|---|---|---|---|
| 6 | 0.4 | 0.180 | 0.15 | |
| | 0.8 | 0.355 | 0.3 | |
| | 1.2 | 0.543 | 0.5 | |
| | 1.6 | 0.715 | 0.9 | |
| | 2.0 | 0.889 | 1.25 | |
| | 2.4 | 1.057 | 1.65 | |
| | 2.8 | 1.223 | 2.4 | |
| | 3.2 | 1.405 | 3.0 | |
| | 3.6 | 1.572 | 3.7 | |
| | 4.0 | 1.734 | 4.6 | |

TABLE 19

Attractive Force under Varying Current

| L1' (mm) | Current (A) | Voltage (V) | F' (kgf) | Remarks |
|---|---|---|---|---|
| 7 | 0.4 | 0.184 | 0.1 | |
| | 0.8 | 0.356 | 0.25 | |
| | 1.2 | 0.533 | 0.45 | |
| | 1.6 | 0.710 | 0.7 | |
| | 2.0 | 0.882 | 1.0 | |
| | 2.4 | 1.058 | 1.4 | |
| | 2.8 | 1.229 | 1.8 | |
| | 3.2 | 1.403 | 2.3 | |
| | 3.6 | 1.581 | 3.0 | |
| | 4.0 | 1.738 | 3.7 | |

TABLE 20

Attractive Force under Varying Current

| L1' (mm) | Current (A) | Voltage (V) | F' (kgf) | Remarks |
|---|---|---|---|---|
| 8 | 0.4 | 0.184 | — | |
| | 0.8 | 0.357 | 0.2 | |
| | 1.2 | 0.533 | 0.4 | |
| | 1.6 | 0.713 | 0.6 | |
| | 2.0 | 0.883 | 1.0 | |
| | 2.4 | 1.058 | 1.2 | |
| | 2.8 | 1.224 | 1.5 | |
| | 3.2 | 1.410 | 1.8 | |
| | 3.6 | 1.573 | 2.5 | |
| | 4.0 | 1.730 | 2.9 | |

TABLE 21

Attractive Force under Varying Current

| L1' (mm) | Current (A) | Voltage (V) | F' (kgf) | Remarks |
|---|---|---|---|---|
| 9 | 0.4 | 0.184 | — | |
| | 0.8 | 0.359 | 0.2 | |
| | 1.2 | 0.533 | 0.4 | |
| | 1.6 | 0.713 | 0.6 | |
| | 2.0 | 0.886 | 0.8 | |
| | 2.4 | 1.058 | 0.95 | |
| | 2.8 | 1.230 | 1.35 | |
| | 3.2 | 1.411 | 1.6 | |
| | 3.6 | 1.574 | 2.1 | |
| | 4.0 | 1.732 | 2.5 | |

TABLE 22

Attractive Force under Varying Current

| L1' (mm) | Current (A) | Voltage (V) | F' (kgf) | Remarks |
|---|---|---|---|---|
| 10 | 0.4 | 0.184 | — | |
| | 0.8 | 0.360 | — | |
| | 1.2 | 0.533 | 0.4 | |
| | 1.6 | 0.714 | 0.6 | |
| | 2.0 | 0.890 | 0.7 | |
| | 2.4 | 1.055 | 0.9 | |
| | 2.8 | 1.227 | 1.15 | |
| | 3.2 | 1.407 | 1.4 | |
| | 3.6 | 1.578 | 1.75 | |
| | 4.0 | 1.730 | 2.0 | |

Figure 5:
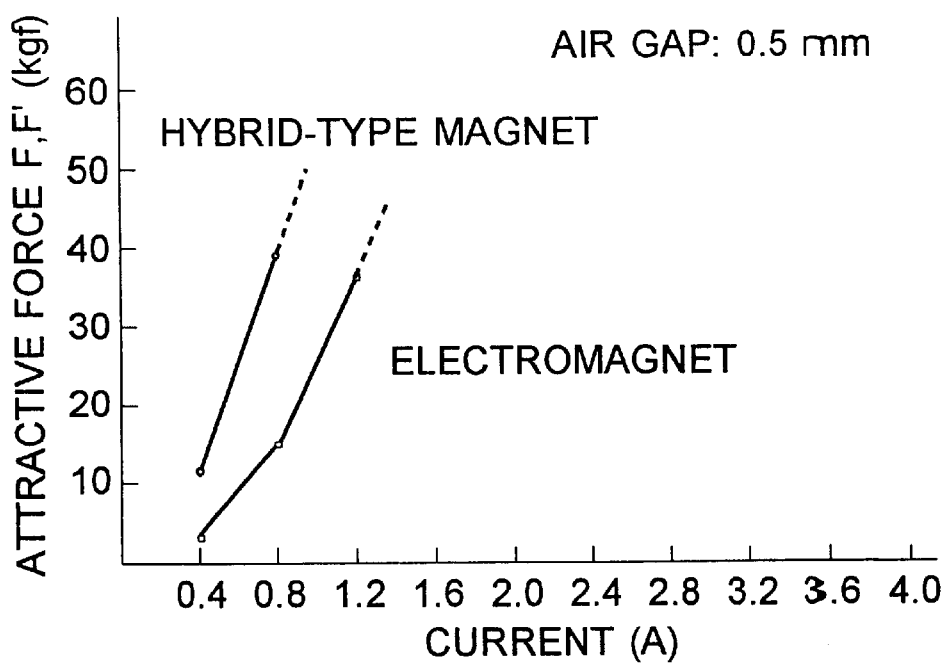
FIG. 5 is a graphical representation showing comparison between attractive force generated by a hybrid-type magnet and attractive force generated by an electromagnet, when a gap defined between each of the hybrid-type magnet and electromagnet and a movable member is 0.5 mm.

Table 12 indicates that the air gap L1' of 0.5 mm permits the attractive force to be rapidly increased with an increase in current, as noted from the fact that the attractive force F' was 3.9 kgf at the current of 0.4 A, 15.0 kgf at the current of 0.8 A and 36.0 kgf at 1.2 A. However, comparison between Table 12 and Table 1 described above indicates that attractive force obtained by the hybrid-type magnet 10 is 2.9 (=11.5/3.9) times at the current of 0.4 A and 2.6 (=39.0/15.0) times at the current of 0.8 A, as compared with attractive force obtained by only the electromagnet. Thus, a combination of the electromagnet 16 with the permanent magnet 18 exhibits increased attractive force at the same power consumption as compared with that obtained by only the electromagnet 16. The permanent magnet 18 does not consume energy, to thereby contribute to energy savings. The results of Tables 1 and 12 are also shown in FIG. 5.

Tables 13 to 22 also indicate results obtained by measuring attractive force with respect to the movable member 30 while varying an air gap L1' within a range between 1 mm and 10 mm and varying a current flowed through the excitation oil 14.

Table 22 indicates that the air gap L1' of 10 mm permitted the attractive force F' to be 0.4 kgf at the current of 1.2 A, 0.6 kgf at 1.6 A, 0.7 kgf at 2.0 A, 0.9 kgf at 2.4 A, 1.15 kgf at 2.8 A, 1.4 kgf at 3.2 A, 1.75 kgf at 3.6 A and 2.0 kgf at 4.0 A.

Figure 6:
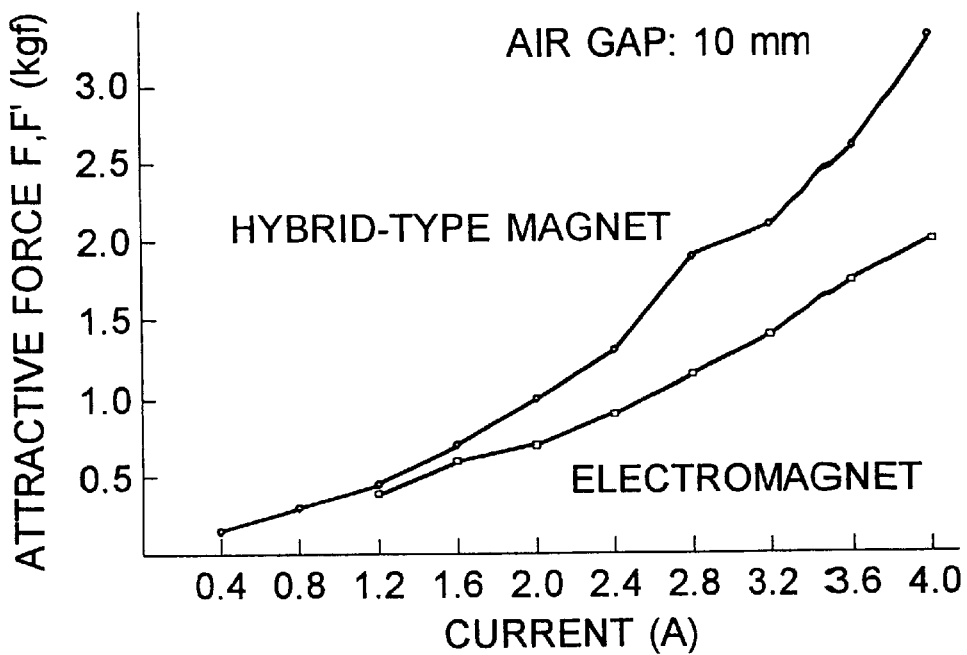
FIG. 6 is a graphical representation showing comparison between attractive force generated by a hybrid-type magnet and attractive force generated by an electromagnet, when a gap defined between each of the hybrid-type magnet and electromagnet and a movable member is 10 mm.

Now, Table 11 showing attractive force obtained by the hybrid-type magnet 10 will be compared with Table 22. The comparison indicates that attractive force obtained by the hybrid-type magnet 10 is 1.1 (=0.45/0.4) times at the current of 1.2 A, 1.2 (=0.7/0.6) times at the current of 1.6 A, 1.4 (=1.0/0.7) times at 2.0 A, 1.4 (=1.3/0.9) times at 2.4 A, 1.6 (=1.9/1.15) times at 2.8 A, 1.5 (=2.1/1/4) times at 3.2 A, 1.5 (=2.6/1.75) times at 3.6 A and 1.6 (=3.3/2.0) times at 4.0 A, as compared with attractive force obtained by only the electromagnet 16. The former attractive force is about 1.4 times as large as the latter one on an average. As compared with the above-described attractive force obtained when the air gap L1 is 0.5 mm, a decrease in air gap L1 (L1') permits an increase in advantage of the hybrid-type magnet. Thus, it will be noted that the hybrid-type magnet 10 constituted of the permanent magnet 18 and electromagnet 16 according to the illustrated embodiment effectively utilizes energy. Also, in the illustrated embodiment, control of a current flowed through the excitation coil 14 permits attractive force exhibited by the permanent magnet 18 to be variably controlled. The results of Tables 11 and 22 are also shown in FIG. 6.

As can be seen from the foregoing, the hybrid-type magnet of the illustrated embodiment is constructed of the electromagnet including the core made of a magnetic material and formed to have a U-shape and the excitation coil wound on the core, and the bar-like engagement member which includes the permanent magnet and magnetic members arranged so as to interpose the permanent magnet therebetween and is closely joined to the opposite ends of the core so as to be extended over the opening of the core. Such construction permits the hybrid-type magnet to exhibit significantly increased attractive force while minimizing current consumption, to thereby attain energy savings.

Figure 7A:
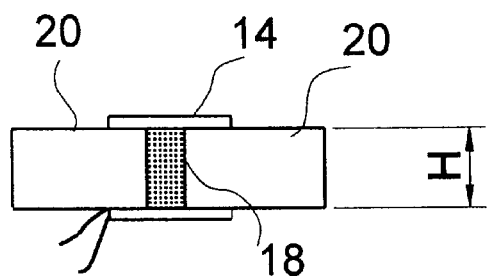
FIG. 7A is a plan view showing another embodiment of a hybrid-type magnet according to the present invention.
Figure 7B:
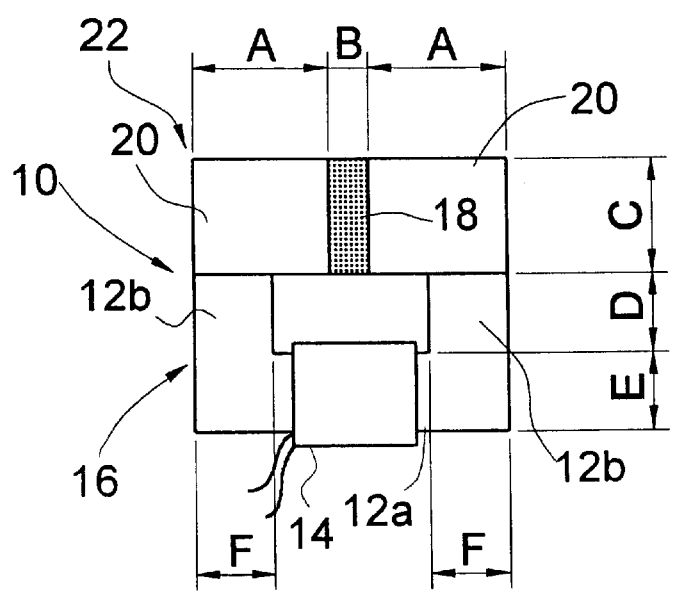
FIG. 7B is a front elevation view of the hybrid-type magnet shown in FIG. 7A.
Figure 7C:
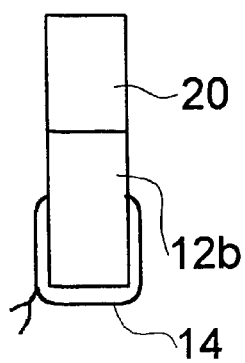
FIG. 7C is a side elevation view of the hybrid-type magnet Shown in FIG. 7A.

Referring now to FIGS. 7A to 7C, another embodiment of a hybrid-type magnet according to the present invention is illustrated. A hybrid-type magnet of the illustrated embodiment which is generally designated at reference numeral 10 likewise generally includes two major components. One of the components is an electromagnet 16 which includes a core 12 and an excitation coil 14 wound on the core 12. The core 12 is constituted of a core body 12a and a pair of arms 12b of a rectangular shape in section arranged on opposite lateral sides of the core body 12a so as to form a U-shape in cooperation with the core body 12a. The other component is a rectangular bar-like engagement member 22, which includes a permanent magnet (neodymium magnet) 18 and two magnetic members 20 arranged on opposite sides of the permanent magnet 18 so as to interpose it therebetween and is closely joined to both arms 12b of the core 12 so as to be extended between outer ends of the arms 12b. The engagement member 22 is so arranged that the permanent magnet 18 is positioned between the arms 12b of the core 12. The magnetic members 20 may be made of a soft magnetic material.

The electromagnet 16, as described above, includes the U-shaped core 12, which may be formed by laminating pure iron plates of a soft magnetic material on each other. In the illustrated embodiment, as shown in FIGS. 7A to 7C, the arms 12b of the core 12 are each formed to have a width F of 10 mm, a height D of 10 mm and a thickness H of 10 mm. The height D is defined to be a distance between an upper end of the core body 12a and an upper end of the arm 12b. This results in each of the arms 12b having a cross sectional area of 100 mm².

The engagement member 22 is so constructed that the permanent magnet 18 and magnetic members 20 each have a cross section formed to have the same rectangular shape, resulting being generally formed to have a single bar-like configuration.

The permanent magnet 18 is formed to have dimensions of 15 mm in height C, 5 mm in width B and 10 mm in thickness H. The magnetic members 20 arranged on the opposite sides of the permanent magnet 18 are each formed to have dimensions of 15 mm in height C, 17.5 mm in width A and 10 mm in thickness H. This results in the permanent magnet 18 and magnetic members 20 each having a vertical sectional area of 150 mm². The magnetic members 20 may be made of, for example, pure iron. Alternatively, it may be made of a material increased in saturation magnetic flux density and/or permeability as compared with pure iron, such as permalloy, silicon steel or the like.

The excitation coil 14 is made of a copper wire having a diameter of 0.6 mm, which is wound 420 turns on the core 12 of the electromagnet 16.

Now, characteristics of the hybrid-type magnet 10 of the illustrated embodiment thus constructed will be described.

First of all, when the excitation coil 14 of the electromagnet 16 is kept from being fed with a current, a line of magnetic force generated by the permanent magnet 18 forms a closed magnetic path passing through the N pole of the permanent magnet 18, one of the magnetic members 20, the core 12, the other of the magnetic members 20 and the S pole of the permanent magnet 18, to thereby substantially prevent leakage of a magnetic flux to the air. This permits increased attractive force to be generated between the arms 12b of the core 12 and the engagement member 22. Thus, even when a magnetic material is approached to the engagement member 22, the magnetic material is kept from being affected by the hybrid-type magnet 10.

Figure 8A:
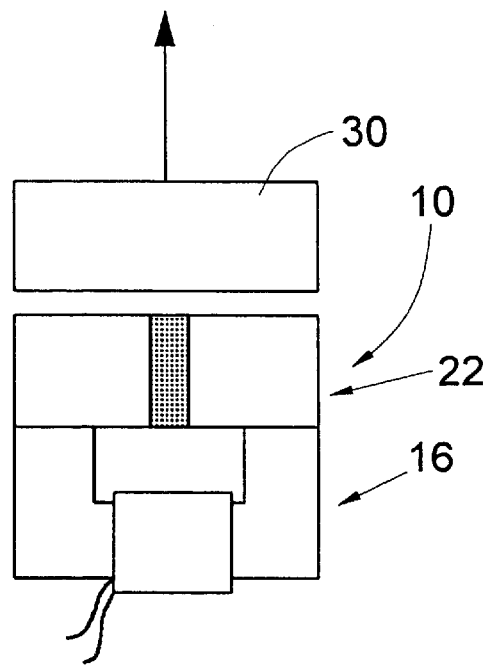
FIGS. 8A and 8B are a front elevation view and a side elevation view each showing a manner of measuring separating force of the hybrid-type magnet shown in FIGS. 7A to 7C, respectively.
Figure 8B:
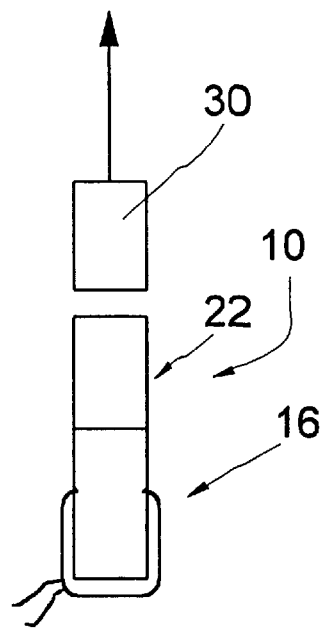
Figure 9A:
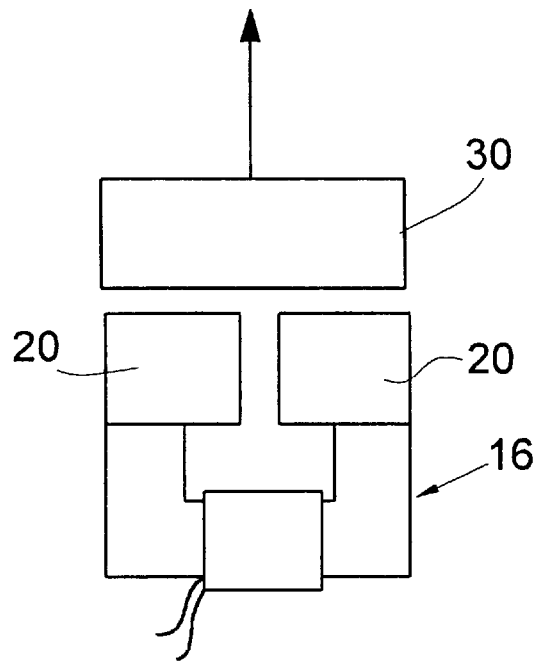
FIGS. 9A and 9B are a front elevation view and a side elevation view each showing a manner of measuring separating force of the hybrid-type magnet shown in FIGS. 7A to 7C while keeping a permanent magnet detached from the hybrid-type magnet, respectively.
Figure 9B:
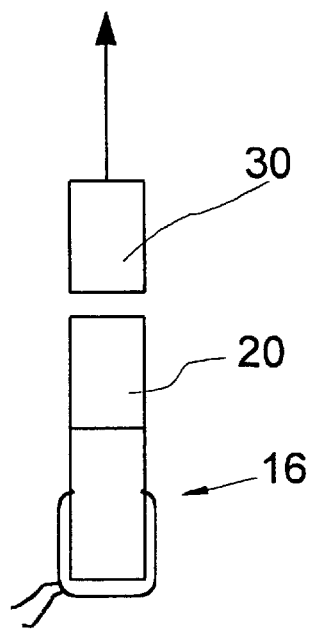
Figure 10A:
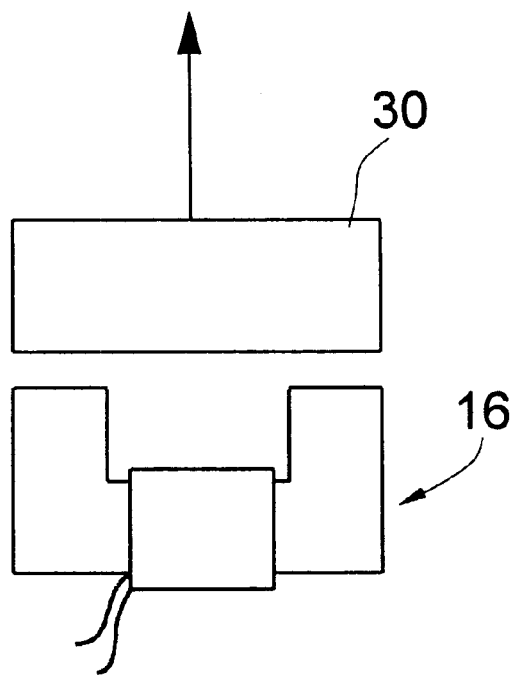
FIGS. 10A and 10B are a front elevation view and a side elevation view each showing a manner of measuring separating force of the hybrid-type magnet shown in FIGS. 7A to 7C while keeping an engagement member detached from the hybrid-type magnet, respectively.
Figure 10B:
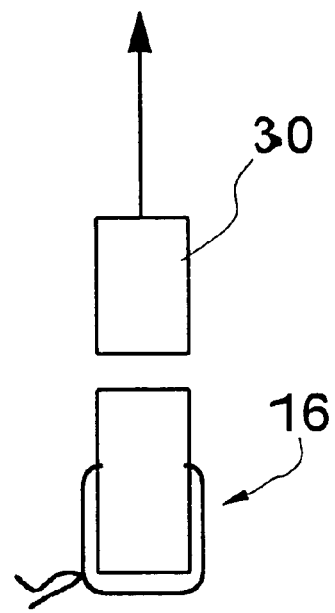
Figure 11A:
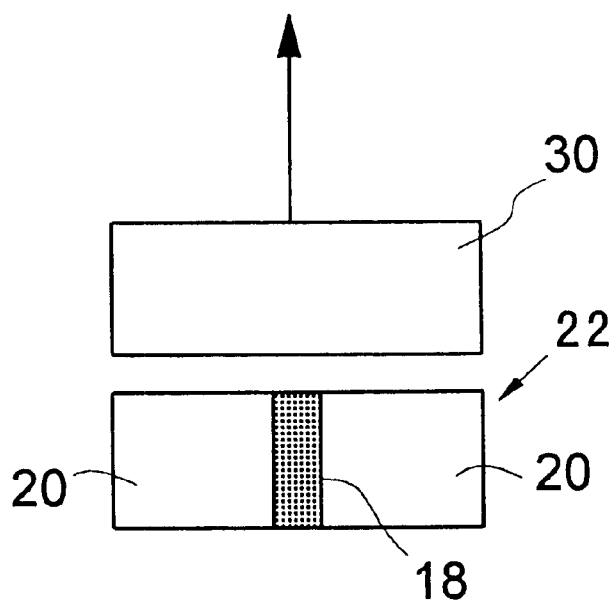
FIGS. 11A and 11B are a front elevation view and a side elevation view each showing measurement of separating force of the hybrid-type magnet shown in FIGS. 7A to 7C carried out using only the engagement member including a permanent magnet, respectively.
Figure 11B:
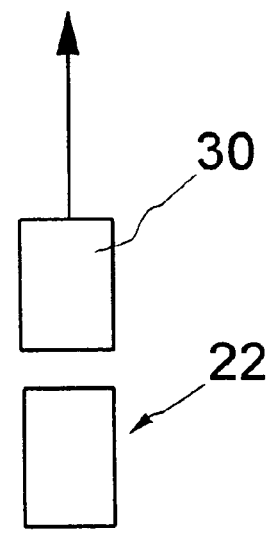

An experiment was carried out wherein a current is fed to the excitation coil 14 of the electromagnet 16 to permit the excitation coil 14 to generate a magnetic flux in a direction opposite to the line of magnetic force of the permanent magnet 18. For this purpose, first of all, a movable member or magnetic element (hereinafter also referred to as "piece") 30 made of a magnetic material and formed to have dimensions of 40 mm in width, 15 mm in height and 10 mm in thickness was kept in contact with the engagement member 22. Then, separating force required for separating the movable member 30 from the hybrid-type magnet 10 was measured while being applied to the movable member 30 in a direction indicated at an arrow in FIGS. 8A and 8B. For comparison, a maximum value of the separating force required when only the permanent magnet 18 is removed from the hybrid-type magnet 10 as shown in FIGS. 9A and 9B, when both permanent magnet 18 and engagement member 22 are detached from the hybrid-type magnet 10 as shown in FIGS. 10A and 10B, and when only the permanent magnet 18 is kept interposed between the magnetic members 20 as shown in FIGS. 11A and 11B was likewise measured. The results are shown in Table 23, wherein (1) indicates data obtained when the movable member or magnetic element 30 is made of Ferroperm manufactured by NKK CORP. and (2) indicates data when it is made of pure iron. An apparatus used for the measurement was AT-10T SHIMADZU LOAD CELL TYPE SBL-1kN (Resolution: Max. 100 kgf, Min. 10 gf).

TABLE 23

Maximum Value of Separating Force

| Current (A) | *1 (1) (kgf) | *2 (2) (kgf) | *3 (2) (kgf) | *4 (1) (kgf) | *5 (2) (kgf) | *6 (1) (kgf) | *7 (2) (kgf) |
|---|---|---|---|---|---|---|---|
| 0 | 3.18 | 2.08 | — | — | — | | |
| 0.2 | 13.48 | 8.33 | 4.43 | 11.93 | 8.03 | | |
| 0.4 | 24.95 | 19.78 | 7.10 | 14.23 | 12.18 | | |
| 0.6 | 30.20 | 26.10 | 7.75 | 15.30 | 13.55 | | |
| 0.8 | 31.93 | 30.35 | 8.28 | 16.10 | 14.48 | 15.40 | 13.23 |
| 1.0 | 33.33 | 31.50 | 8.48 | 16.78 | 15.25 | | |
| 1.2 | 34.48 | 32.25 | 9.03 | 17.15 | 15.75 | | |
| 1.4 | 34.90 | 32.93 | 9.45 | 18.03 | 16.38 | | |
| 1.6 | 35.38 | 33.63 | 9.75 | 18.43 | 16.58 | | |
| 1.8 | 35.63 | 33.53 | 9.95 | 18.80 | 17.05 | | |
| 2.0 | 35.68 | 34.18 | 10.25 | 19.23 | 17.48 | | |

*1: Electromagnet + permanent magnet
*2: Electromagnet + permanent magnet
*3: Electromagnet (with magnetic members)
*4: Electromagnet (without magnetic members)
*5: Electromagnet (without magnetic members)
*6: Permanent magnet
*7: Permanent magnet
(1): Movable member (piece) made of Ferroperm
(2): Movable member (piece) made of pure iron As shown in Table 23, a combination of the electromagnet and permanent magnet required separating force for separating the movable member from the hybrid-type magnet 10 even when the current is 0 A. This would be due to leakage magnetic flux. When the current is 0.2 A, separating force required in the case of a combination of the electromagnet and permanent magnet was decreased as compared with that required when only the permanent magnet is used. This would be for the reason that the current at such a level fails to cancel a magnetic flux of the permanent magnet. The separating force was abruptly required at the time when the current exceeds a level of 0.4 A and approximated a sum of the separating force required in the case of only the electromagnet and that in the case of only the permanent magnet. The structure shown in FIGS. 9A and 9B permitted a magnetic path to be formed between the magnetic members 20 through an air gap, resulting in attractive force with respect to the movable member 30 being decreased as compared with that obtained in the structure shown in FIGS. 10A and 10B.

Then, a maximum value of the separating force was measured while varying a thickness of the movable member 30. Tables 24, 25, 26 and 27 show the results obtained when the movable member 30 was formed to have a thickness of 5 mm, 7.5 mm, 12.5 mm and 15 mm, respectively. The results obtained at the thickness of 10 mm are shown in Table 23 described above.

TABLE 24

Maximum Value of Separating Force
(Thickness of Movable Member (Piece): 5 mm)

| Current (A) | *1 (1) (kgf) | *2 (1) (kgf) | *3 (1) (kgf) |
|---|---|---|---|
| 0 | 4.93 | — | |
| 0.2 | 13.15 | 5.45 | |
| 0.4 | 19.05 | 8.88 | |
| 0.6 | 22.35 | 10.70 | |
| 0.8 | 24.40 | 11.98 | |
| 1.0 | 25.70 | 12.58 | 20.65 |
| 1.2 | 27.18 | 13.05 | |
| 1.4 | 27.90 | 13.40 | |
| 1.6 | 28.70 | 13.70 | |
| 1.8 | 29.63 | 13.98 | |
| 2.0 | 29.78 | 14.15 | |

*1: Electromagnet + permanent magnet
*2: Electromagnet (without magnetic members)
*3: Permanent magnet
(1): Movable member (piece) made of Ferroperm

TABLE 25

Maximum Value of Separating Force
(Thickness of Movable Member (Piece): 7.5 mm)

| Current (A) | *1 (1) (kgf) | *2 (1) (kgf) | *3 (1) (kgf) |
|---|---|---|---|
| 0 | 3.03 | — | |
| 0.2 | 10.25 | 8.53 | |
| 0.4 | 21.70 | 11.83 | |
| 0.6 | 25.63 | 12.70 | |
| 0.8 | 27.98 | 13.83 | |
| 1.0 | 30.13 | 13.78 | 15.85 |
| 1.2 | 31.23 | 14.08 | |
| 1.4 | 31.73 | 14.80 | |
| 1.6 | 32.30 | 15.18 | |
| 1.8 | 33.05 | 15.83 | |
| 2.0 | 33.85 | 16.08 | |

*1: Electromagnet + permanent magnet
*2: Electromagnet (without magnetic members)
*3: Permanent magnet
(1): Movable member (piece) made of Ferroperm

TABLE 26

Maximum Value of Separating Force
(Thickness of Movable Member (Piece): 12.5 mm)

| Current (A) | *1 (1) (kgf) | *2 (1) (kgf) | *3 (1) (kgf) |
|---|---|---|---|
| 0 | 2.93 | — | |
| 0.2 | 23.43 | 9.63 | |
| 0.4 | 28.98 | 12.60 | |
| 0.6 | 30.73 | 13.50 | |
| 0.8 | 31.15 | 14.30 | |
| 1.0 | 31.73 | 15.05 | 15.15 |
| 1.2 | 32.43 | 15.60 | |
| 1.4 | 32.93 | 16.15 | |
| 1.6 | 33.18 | 16.55 | |
| 1.8 | 34.03 | 17.00 | |
| 2.0 | 34.23 | 17.23 | |

*1: Electromagnet + permanent magnet
*2: Electromagnet (without magnetic members)
*3: Permanent magnet
(1): Movable member (piece) made of Ferroperm

TABLE 27

Maximum Value of Separating Force
(Thickness of Movable Member (Piece): 15 mm)

| Current (A) | *1 (1) (kgf) | *2 (1) (kgf) | *3 (1) (kgf) |
|---|---|---|---|
| 0 | 3.50 | — | |
| 0.2 | 19.63 | 9.20 | |
| 0.4 | 26.45 | 11.40 | |
| 0.6 | 29.08 | 12.40 | |
| 0.8 | 30.70 | 12.75 | |
| 1.0 | 31.30 | 13.45 | 14.15 |
| 1.2 | 32.05 | 13.88 | |
| 1.4 | 33.05 | 14.40 | |
| 1.6 | 33.35 | 14.80 | |
| 1.8 | 34.05 | 15.45 | |
| 2.0 | 34.78 | 15.88 | |

*1: Electromagnet + permanent magnet
*2: Electromagnet (without magnetic members)
*3: Permanent magnet
(1): Movable member (piece) made of Ferroperm As will be noted from Tables 24 to 27, a thickness of the movable member 30 of 5 mm or less causes a reduction in separating force. Also, the thickness between 7.5 mm and 15 mm keeps the separating force substantially unvaried.

In any event, it was found that the hybrid-type magnet 10 of the illustrated embodiment permits energy of the permanent magnet which is said to be kept from energy loss to externally act while being added to energy of the electromagnet due to control of a current flowed through the electromagnet, thus, a reduction of the current to a level of 0 A is merely required to keep the energy from affecting an exterior of the hybrid-type magnet 10.

Figure 12:
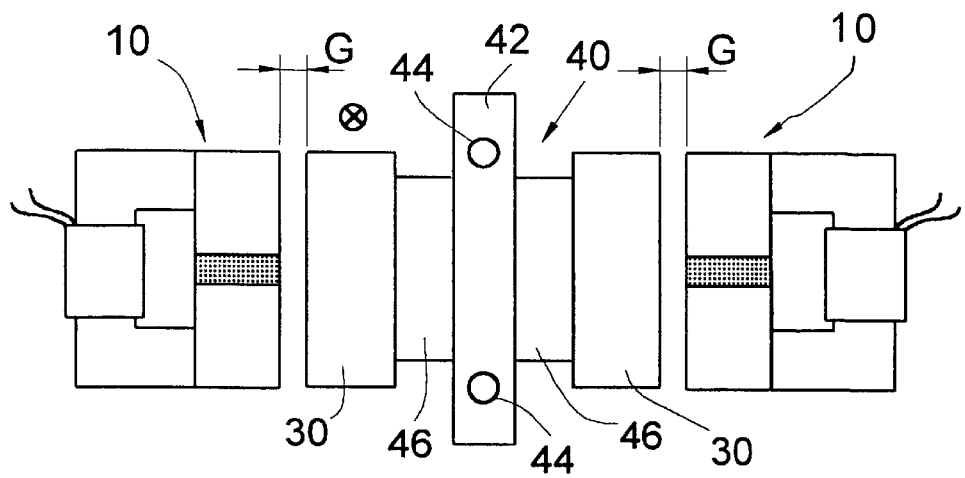
FIG. 12 is a schematic view showing a structure for examining attractive force acting when the hybrid-type magnet of FIGS. 7A to 7C and a magnetic element pass each other.
Figure 13:
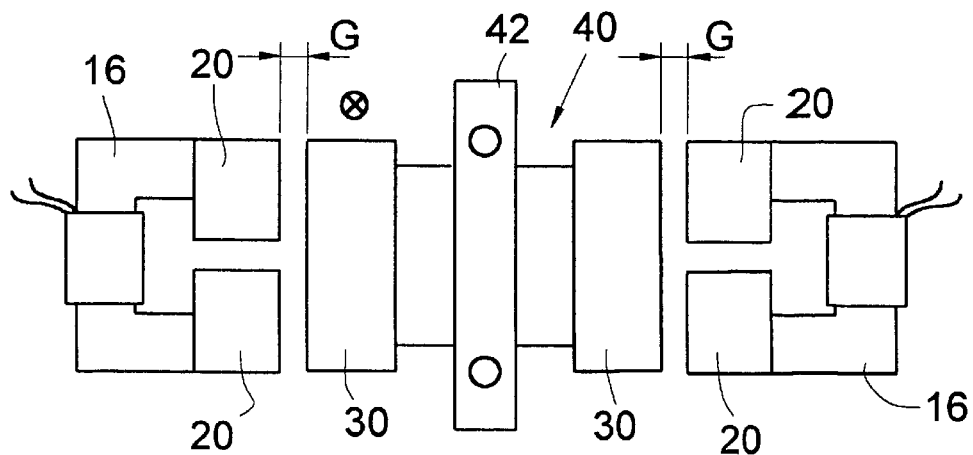
FIG. 13 is a schematic view showing a structure for examining attractive force acting when the hybrid-type magnet of FIGS. 7A to 7C and a magnetic element pass each other while keeping a permanent magnet detached from the hybrid-type magnet.
Figure 14:
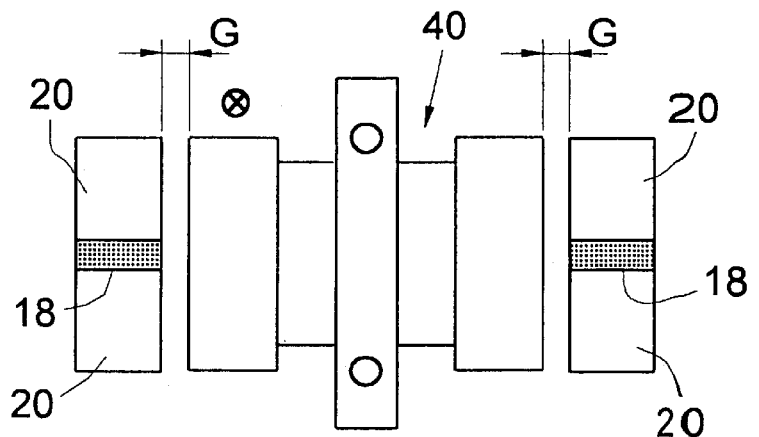
FIG. 14 is a schematic view showing a structure for examining attractive force acting when only the engagement member of the hybrid-type magnet of FIGS. 7A to 7C and a magnetic element pass each other.
Figure 15A:
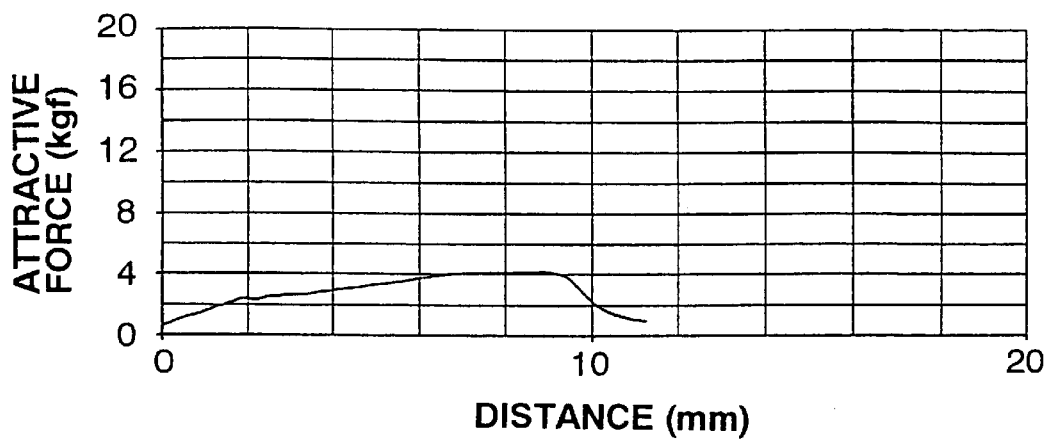
FIG. 15A is a graphical representation showing relationship between attractive force acting when the hybrid-type magnet of FIGS. 7A to 7C and the magnetic element pass each other and a distance between the hybrid-type magnet and the magnetic element under the conditions that a gap G is set to be 0.2 mm and a current of 2.0 A is flowed through an excitation coil.
Figure 15B:
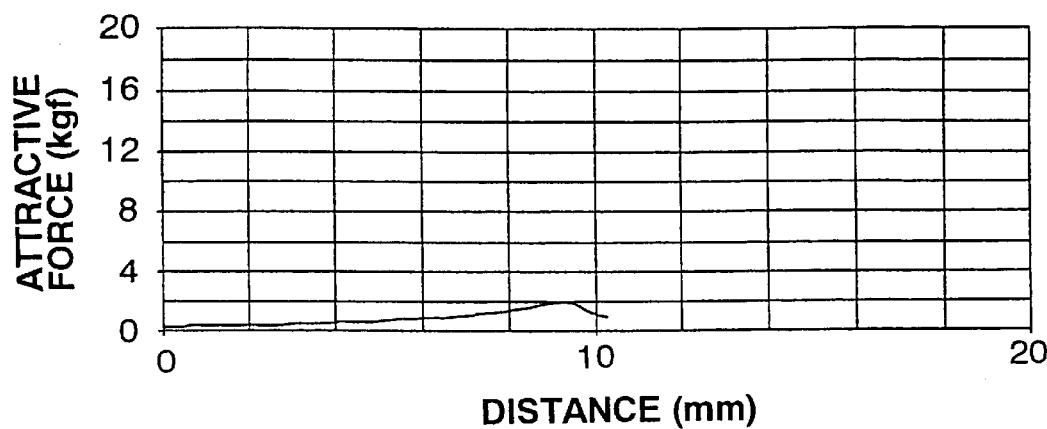
FIG. 15B is a graphical representation showing relationship between attractive force acting when the hybrid-type magnet of FIGS. 7A to 7C and the magnetic element pass each other and a distance therebetween while keeping the permanent magnet detached from the hybrid-type magnet under the conditions that a gap G is set to be 0.2 mm and a current of 2.0 A is flowed through an excitation coil.
Figure 15C:
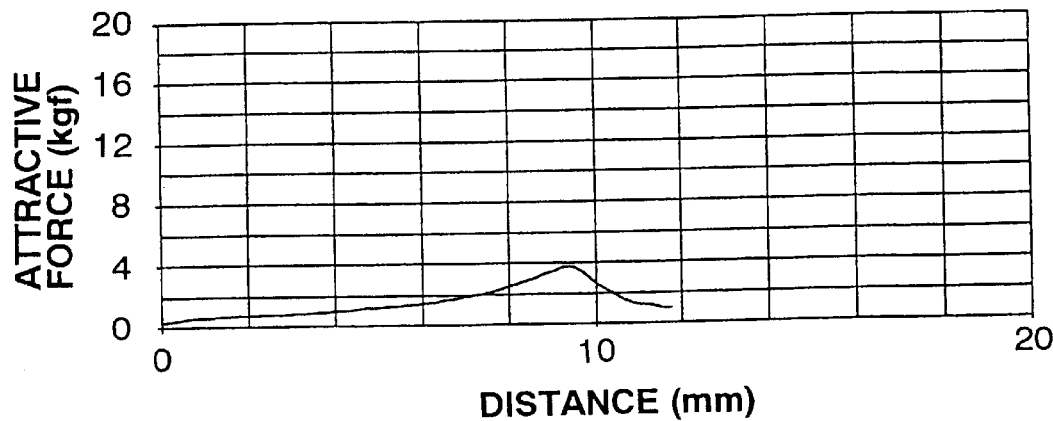
FIG. 15C is a graphical representation showing relationship between attractive force acting when the hybrid-type magnet of FIGS. 7A to 7C and the magnetic element pass each other and a distance therebetween, which relationship is obtained using only the engagement member under the conditions that a gap G is set to be 0.2 mm and a current of 2.0 A is flowed through an excitation coil.
Figure 16A:
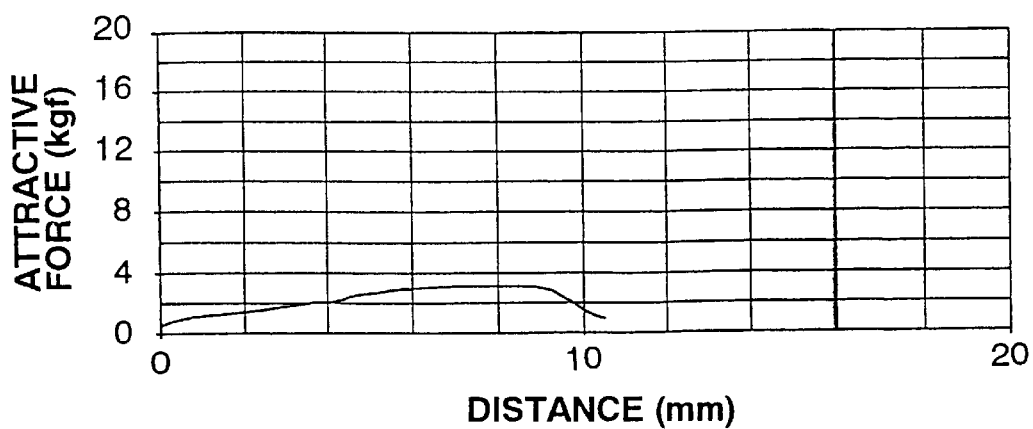
FIG. 16A is a graphical representation showing relationship between attractive force acting when the hybrid-type magnet of FIGS. 7A to 7C and the magnetic element pass each other and a distance therebetween under the condition that a gap G is set to be 0.3 mm.
Figure 16B:
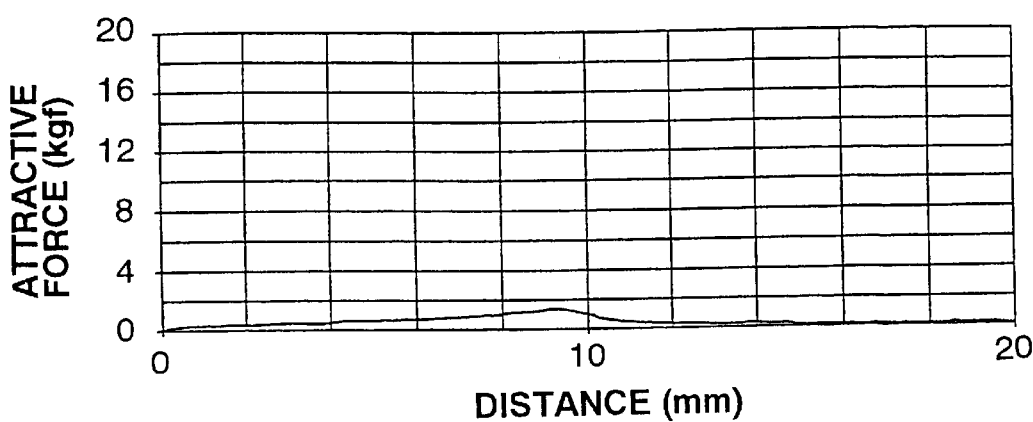
FIG. 16B is a graphical representation showing relationship between attractive force acting when the hybrid-type magnet of FIGS. 7A to 7C and the magnetic element pass each other and a distance therebetween while keeping the permanent magnet detached from the hybrid-type magnet under the condition that a gap G is set to be 0.3 mm.
Figure 16C:
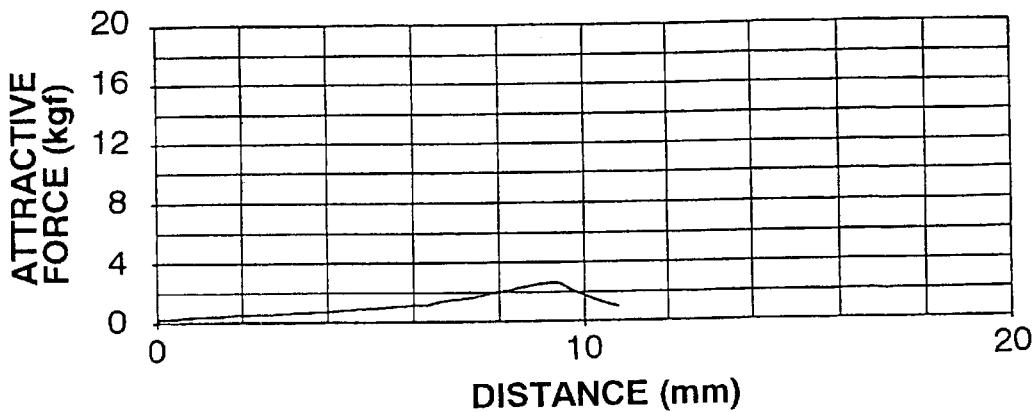
FIG. 16C is a graphical representation showing relationship between attractive force acting when the hybrid-type magnet of FIGS. 7A to 7C and the magnetic element pass each other and a distance therebetween, which relationship is obtained using only the engagement member under the condition that a gap G is set to be 0.3 mm.
Figure 17A:
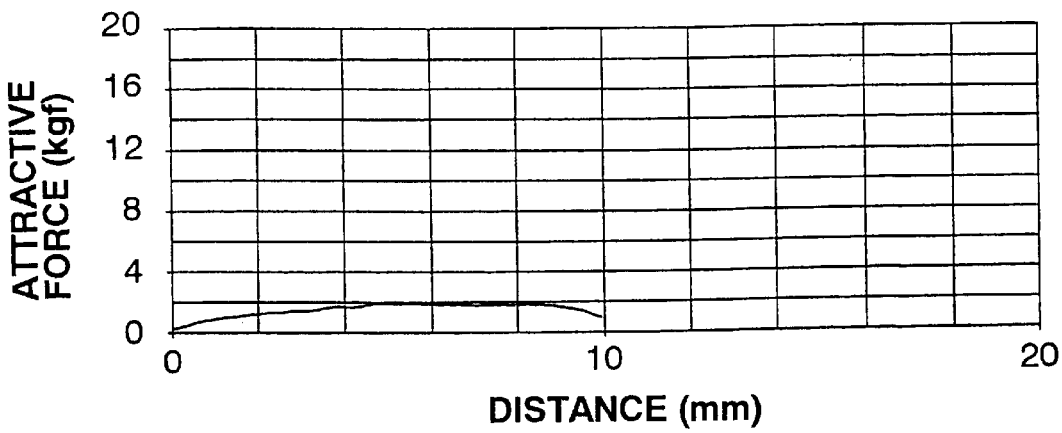
FIG. 17A is a graphical representation showing relationship between attractive force acting when the hybrid-type magnet of FIGS. 7A to 7C and the magnetic element pass each other and a distance therebetween under the condition that a gap G is set to be 0.4 mm.
Figure 17B:
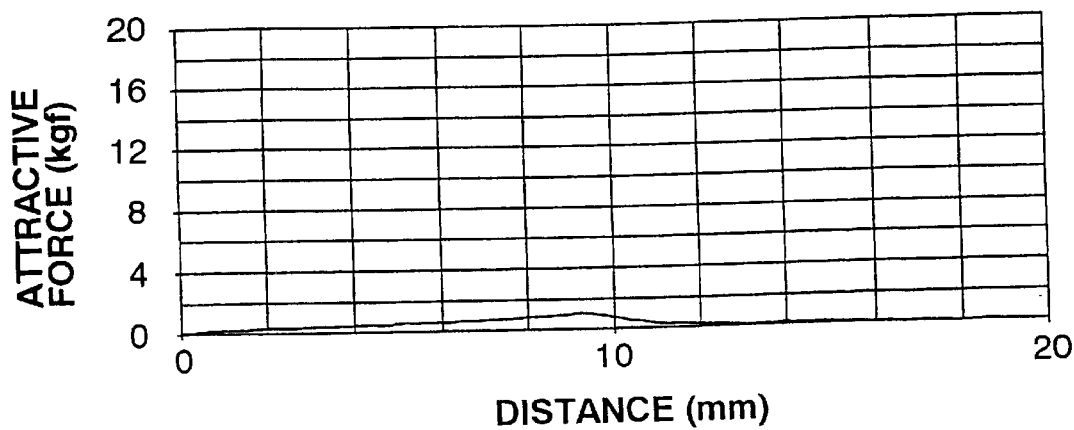
FIG. 17B is a graphical representation showing relationship between attractive force acting when the hybrid-type magnet of FIGS. 7A to 7C and the magnetic element pass each other and a distance therebetween while keeping the permanent magnet detached from the hybrid-type magnet under the condition that a gap G is set to be 0.4 mm.
Figure 17C:
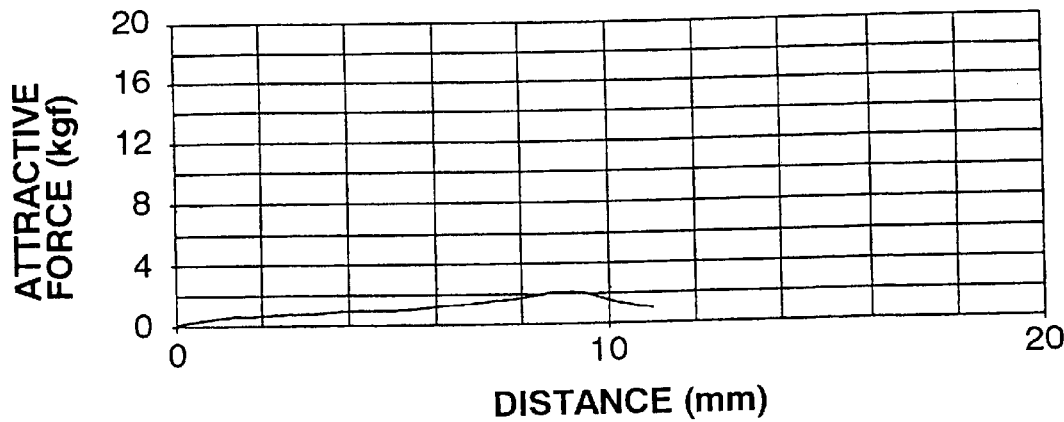
FIG. 17C is a graphical representation showing relationship between attractive force acting when the hybrid-type magnet of FIGS. 7A to 7C and the magnetic element pass each other and a distance therebetween, which relationship is obtained using only the engagement member under the condition that a gap G is set to be 0.4 mm.
Figure 18A:
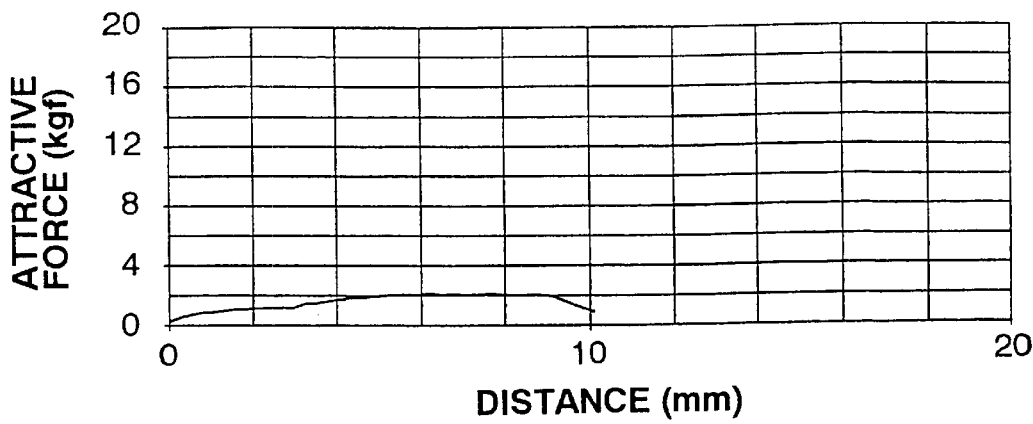
FIG. 18A is a graphical representation showing relationship between attractive force acting when the hybrid-type magnet of FIGS. 7A to 7C and the magnetic element pass each other and a distance therebetween under the condition that a gap G is set to be 0.5 mm.
Figure 18B:
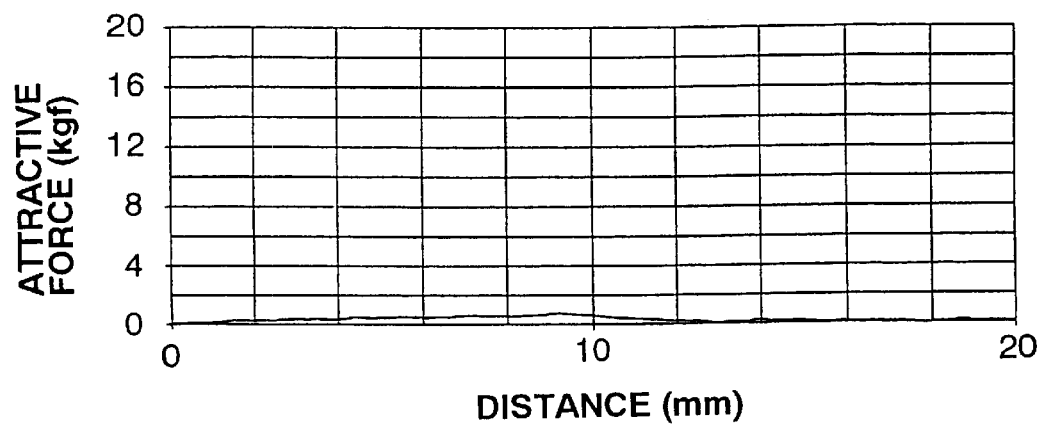
FIG. 18B is a graphical representation showing relationship between attractive force acting when the hybrid-type magnet of FIGS. 7A to 7C and the magnetic element pass each other and a distance therebetween while keeping the permanent magnet detached from the hybrid-type magnet under the condition that a gap G is get to be 0.5 mm.
Figure 18C:
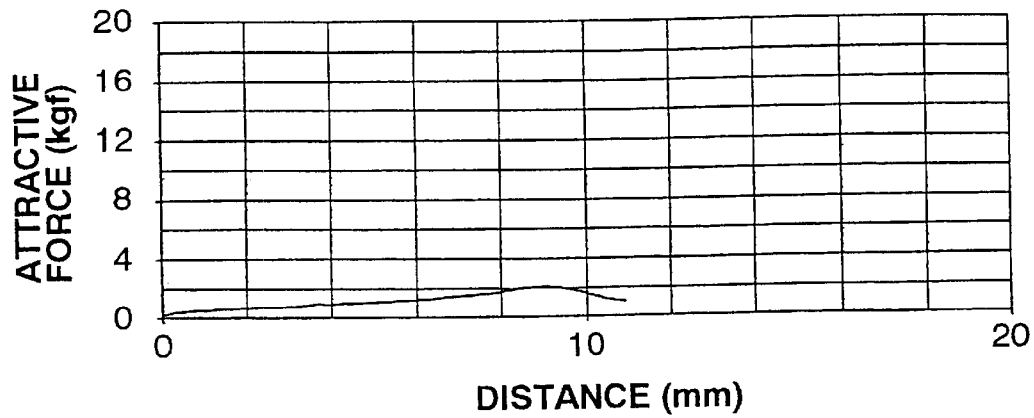
FIG. 18C is a graphical representation showing relationship between attractive force acting when the hybrid-type magnet of FIGS. 7A to 7C and the magnetic element pass each other and a distance therebetween, which relationship is obtained using only the engagement member under the condition that a gap G is set to be 0.5 mm.

Then, an experiment was carried out in order to study an effect which the hybrid-type magnet 10 produces on a magnetic material when the magnet 10 and magnetic material relatively pass each other. The experiment was executed in such a manner as shown in FIG. 12. Also, for comparison, the experiment was carried out with respect to the hybrid-type magnet 10 from which the permanent magnet 18 was detached or only the electromagnet 16 and with respect to only the engagement member 22 including the permanent magnet 18 in such manners as shown in FIGS. 13 and 14, respectively.

As shown in FIG. 12, two such hybrid-type magnets 10 are arranged laterally opposite to each other and a slide member 40 is arranged between the hybrid-type magnets 10 in a manner to be slid in a direction normal to the plane of FIG. 12. The slide member 40 is provided at a central portion thereof with a base section 42 of a square pillar-like shape made of a non-magnetic material. The base 42 is formed at each of two portions thereof vertically spaced from each other with a hole 44, through which a rail (not shown) is inserted. Also, the base 42 is mounted on each of opposite lateral sides thereof with a mount plate 46 made of a non-magnetic material. The mount plate 46 is mounted on an outer surface thereof with the movable member or magnetic element 30. The movable members 30 are each so arranged that a gap G is defined between each of the movable members 30 and the engagement member 22 of the hybrid-type magnet 10.

A further experiment was carried out while varying the gap G between 0.2 mm and 0.5 mm and varying a current flowed through the excitation coil 14 of the electromagnet 16 between 0 A and 2.0 A. In the experiment, the slide member 40 was slid from a front side on the plane of FIG. 12 toward a rear side on the plane to pass the hybrid-type magnet 10, during which attractive force was measured. The results are shown in Tables 28 to 31. Also, Tables 28 to 31 show the results obtained when only the electromagnet 16 shown in FIG. 13 and only the permanent magnet 18 shown in FIG. 14 were used, respectively.

TABLE 28

Maximum Value of Attractive Force during Sliding of Slide Member past Hybrid-Type Magnet (Gap: G = 0.2 mm)

| Current (A) | *1 (1) (kgf) | *2 (1) (kgf) | *3 (1) (kgf) |
|---|---|---|---|
| 0 | 0.38 | — | |
| 0.2 | 0.41 | 0.21 | |
| 0.4 | 0.48 | 0.35 | |
| 0.6 | 0.55 | 0.50 | |
| 0.8 | 0.93 | 0.66 | |
| 1.0 | 1.34 | 1.08 | 3.78 |
| 1.2 | 1.70 | 1.32 | |
| 1.4 | 2.51 | 1.55 | |
| 1.6 | 3.13 | 1.72 | |
| 1.8 | 3.46 | 1.86 | |
| 2.0 | 4.20 | 1.95 | |

*1: Electromagnet + permanent magnet
*2: Electromagnet (with magnetic members)
*3: Permanent magnet
(1): Movable member (piece) made of Ferroperm

TABLE 29

Maximum Value of Attractive Force during Sliding of Slide Member past Hybrid-Type Magnet (Gap: G = 0.3 mm)

| Current (A) | *1 (1) (kgf) | *2 (1) (kgf) | *3 (1) (kgf) |
|---|---|---|---|
| 0 | 0.23 | — | |
| 0.2 | 0.29 | 0.17 | |
| 0.4 | 0.37 | 0.27 | |
| 0.6 | 0.50 | 0.35 | |
| 0.8 | 0.61 | 0.57 | |
| 1.0 | 0.73 | | 2.64 |
| 1.2 | 1.2 | 0.93 | |
| 1.4 | 1.71 | 1.12 | |
| 1.6 | 2.07 | 1.15 | |
| 1.8 | 2.62 | 1.33 | |
| 2.0 | 3.13 | 1.38 | |

*1: Electromagnet + permanent magnet
*2: Electromagnet (with magnetic members)
*3: Permanent magnet
(1): Movable member (piece) made of Ferroperm

TABLE 30

Maximum Value of Attractive Force during Sliding of Slide Member past Hybrid-Type Magnet (Gap: G = 0.4 mm)

| Current (A) | *1 (1) (kgf) | *2 (1) (kgf) | *3 (1) (kgf) |
|---|---|---|---|
| 0 | 0.28 | — | |
| 0.2 | 0.29 | 0.19 | |
| 0.4 | 0.33 | 0.24 | |
| 0.6 | 0.36 | 0.35 | |
| 0.8 | 0.47 | 0.48 | |
| 1.0 | 0.41 | 0.58 | 2.12 |
| 1.2 | 0.68 | 0.85 | |
| 1.4 | 1.06 | 0.82 | |
| 1.6 | 1.32 | 0.93 | |
| 1.8 | 1.41 | 0.99 | |
| 2.0 | 1.90 | 1.11 | |

*1: Electromagnet + permanent magnet
*2: Electromagnet (with magnetic members)
*3: Permanent magnet
(1): Movable member (piece) made of Ferroperm

TABLE 31

Maximum Value of Attractive Force during Sliding of Slide Member past Hybrid-Type Magnet (Gap: G = 0.5 mm)

| Current (A) | *1 (1) (kgf) | *2 (1) (kgf) | *3 (1) (kgf) |
|---|---|---|---|
| 0 | 0.33 | — | |
| 0.2 | 0.28 | 0.17 | |
| 0.4 | 0.30 | 0.19 | |
| 0.6 | 0.36 | 0.25 | |
| 0.8 | 0.44 | 0.39 | |
| 1.0 | 0.75 | 0.39 | 2.12 |
| 1.2 | 0.93 | 0.50 | |
| 1.4 | 1.02 | 0.48 | |
| 1.6 | 1.43 | 0.70 | |
| 1.8 | 1.80 | 0.73 | |
| 2.0 | 2.18 | 0.78 | |

*1: Electromagnet + permanent magnet
*2: Electromagnet (with magnetic members)
*3: Permanent magnet
(1): Movable member (piece) made of Ferroperm As can be seen from Tables 28 to 31, when the current is within a range between 0.2 A and 2.0 A, attractive force which the hybrid-type magnet exerts on the magnetic elements 30 as compared with that obtained with only the electromagnet. Thus, it will be noted that the hybrid-type magnet 10 effectively utilizes energy of the permanent magnet 18.

Also, the experiment revealed a more significant fact. The fact is directed to relationship between attractive force which the hybrid-type magnet 10 exerts on the magnetic elements 30 when the slide member 40 moves past the magnet 10 and a distance therebetween. The attractive force produced when a current of 2.0 A is flowed through the excitation coil while varying the gap G between 0.2 mm and 0.5 mm was measured. The results are shown in FIGS. 15A to 18C. It is a matter of course that the attractive force is irrelevant to the current when only the permanent magnet is used.

As will be noted from FIGS. 15A to 18C, the maximum value is obtained when the distance is about 10 mm. In this regard, the hybrid-type magnet 10 permits the attractive force to be increased in maximum value and generally enhanced as compared with that obtained with only the electromagnet. Thus, the hybrid-type magnet of the illustrated embodiment is increased in value obtained by integration between the distance and the attractive force, to thereby exert increased energy on the slide member 40.

Figure 19A:
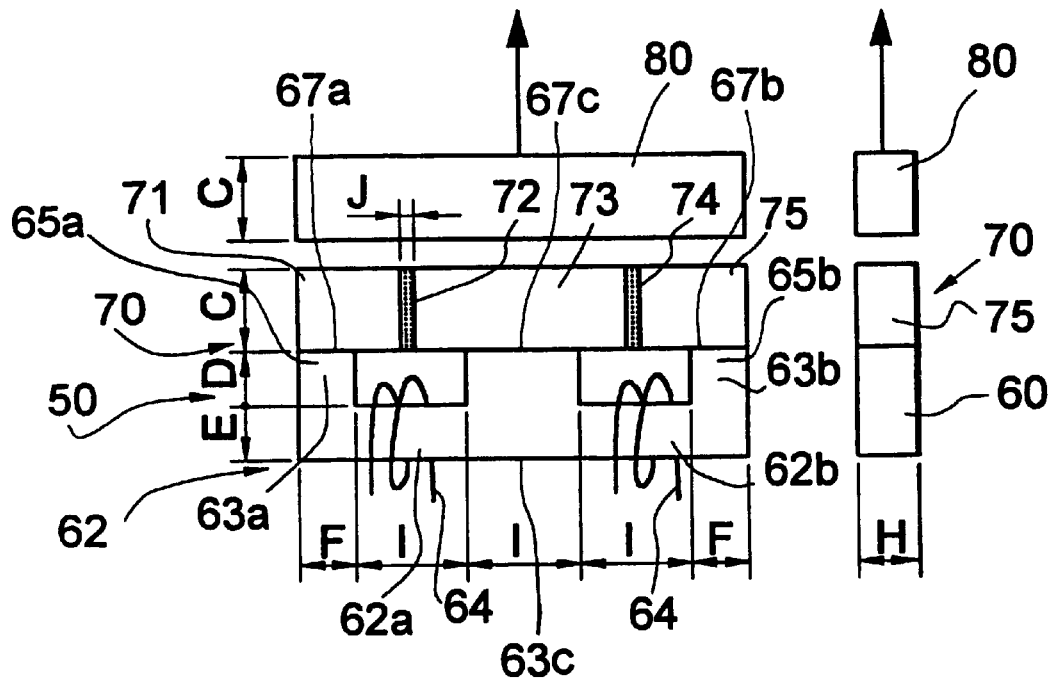
FIGS. 19A and 19B are a front elevation view and a side elevation view showing a manner in which an experiment of separating a movable member from another embodiment of a hybrid-type magnet according to the present invention is carried out under the condition that the permanent magnet is formed to have a width of 2.5, mm, respectively.
Figure 19B:
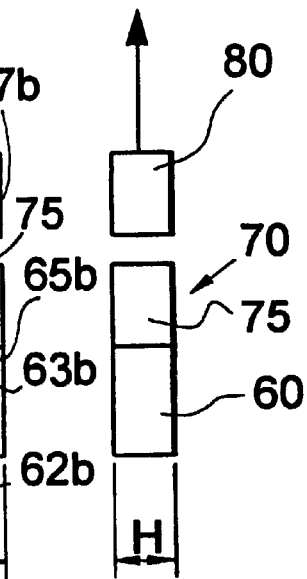

Referring now to FIGS. 19A and 19B, a further embodiment of a hybrid-type magnet according to the present invention is illustrated. A hybrid-type magnet of the illustrated embodiment which is generally designated at reference numeral 50 generally includes two major components. One of the components is an electromagnet 60 constituted of a core 62 and excitation coils 64 wound on the core 62. The core 62 includes a pair of core bodies 62a, 62b, a pair of outer arms 63a, 63b arranged on an outer side of the core bodies 62a 63b so as to interpose the core bodies 62a, 62b therebetween and formed to have a rectangular shape in section, and a central arm 63c arranged so as to be positioned between the core bodies 62a, 62b resulting in being formed to have a substantially E-like shape. The two outer arms 63a, 63b have upper ends 65a, 65b with end surfaces 67a, 67b, respectively. The central arm 63c also has an upper end 65c defining an end surface 67c. The excitation coils 64 are each wound on a respective one of the core bodies 62a of the core 62. The other component is a rectangular pillar-like engagement member 70 arranged so as to be extended between the outer arms 63a, 63b and closely joined to the end surfaces 67a, 67b of the respective outer arms 63a, 63b. The word "rectangular" used in connection with the engagement member 70 includes both "rectangular" and "square". The engagement member 70 includes a first magnetic member 71, a first permanent magnet 72, a second magnetic member 73, a second permanent magnet 74 and a third magnetic member 75 which are joined to each other in order. The first permanent magnet 72 is arranged between one of the outer arms 63a and the central arm 63c and the second permanent magnet 74 is positioned between the other outer arm 63b and the central arm 63c. As shown in FIG. 19A, first magnetic member 71 is joined to the end surface 67a of a first outer arm 63a, second magnetic member 73 is joined to the end surface 67c of central arm 63c, and third magnetic member 75 is joined to the top surface 67b of second outer arm 63b.

The core 62 of the electromagnet 60 is formed by laminating plates of pure iron which is a soft magnetic material on each other. In the illustrated embodiment, the outer arms 62b are each formed to have a width F of 10 mm and a height D of 10 mm and a thickness H of 10 mm. The central arm 63c is formed to have dimensions of 20 mm in width I, 10 mm in height D and 10 mm in thickness. The height of each of the arms 63a and 63b and 63c is defined to be a distance between an upper end of the core body 62a and an upper end of the arm. This results in the arms 63a, 63b and 63c each having a cross sectional area of 100 mm² and that of 200 mm², respectively.

The engagement member 70 was subjected to an experiment using five specimens shown in FIGS. 19A to 23B. In a specimen of FIGS. 19A and 19B, the permanent magnets 72 and 74 and the magnetic members 71, 73 and 75 are formed to have the same rectangular shape in vertical section, so that the engagement member 70 is formed to have a rectangular pillar-like shape. The permanent magnets 72 and 74 are each formed to have dimensions of 15 mm in height C, 2.5 mm in width J and 10 mm in thickness H. The first and third or outer magnetic members 71 and 75 are each formed to have dimensions of 15 mm in height C, 18.75 mm in width and 10 mm in thickness H and the second or central magnetic member 73 is formed to have dimensions of 15 mm in height C, 37.5 mm in width and 10 mm in thickness H. This results in the permanent magnets 72 and 74 and the magnetic members 71, 73 and 75 each having a vertical sectional area of 150 mm². The magnetic members 71, 73 and 75 may be made of, for example, pure iron. Alternatively, it may be made of a material having a saturated magnetic flux density and a permeability higher than pure iron, such as permalloy, silicon steel or the like. The excitation coils 64 wound on the core 62 of the electromagnet 60 are each constituted by 420 turns of a copper wire having a diameter of 0.6 mm.

Figure 20A:
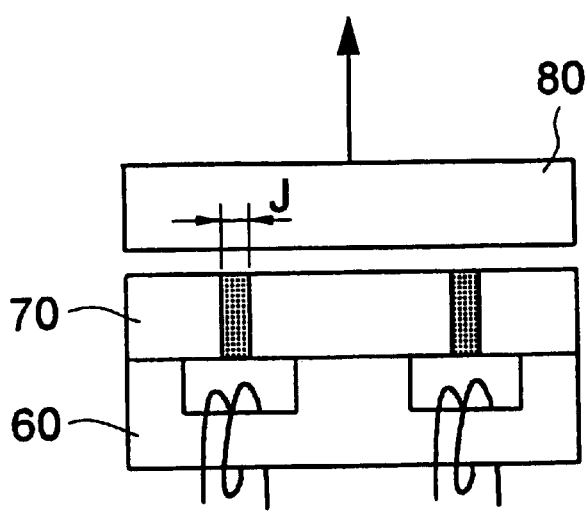
FIGS. 20A and 20B are a front elevation view and a side elevation view similar to FIGS. 19A and 19B, respectively, wherein the permanent magnet is formed to have a width of 5 mm.
Figure 20B:
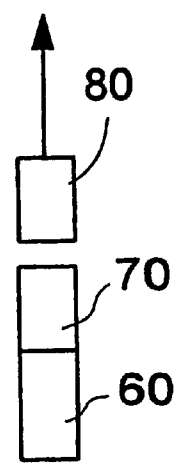

In a specimen of FIGS. 20A and 20B, the permanent magnets 72 and 74 are formed to have a width J of 5 mm. In a specimen of FIGS. 21A and 21B, the permanent magnets 72 and 74 are each formed to have a width J of 10 mm. In a specimen shown in FIGS. 22A and 22B, the permanent magnets 72 and 74 are each formed to have a width J of 15 mm. In a specimen shown in FIGS. 23A and 23B, they are each formed to have a width J of 20 mm.

In the experiment of each of five such specimens, separating force required to separate a movable member or magnetic element 80 made of a magnetic material and formed to have dimensions of 80 mm in width, 15 mm in height and 10 mm in thickness from the engagement member 70 while keeping the movable member 80 in contact with the engagement member 70 in a direction indicated at an arrow was measured. For comparison, the measurement was likewise carried out using each of only the electromagnet 60 shown in FIGS. 24A and 24B and only the engagement member 70 having the permanent magnets 72 and 74 interposed among the magnetic members 71, 73 and 75 as shown in FIGS. 25A and 25B. The results are shown in Table 32.

TABLE 32

Maximum Value of Separating Force due to Width of Permanent Magnet

| Current | *1 (kgf) (1) | | | | | |
|---|---|---|---|---|---|---|
| (A) | 2.5 mm | 5 mm | 10 mm | 15 mm | 20 mm | *2 (kgf) (1) |
| 0 | 4.20 | 5.30 | 5.98 | 7.53 | 4.63 | — |
| 0.2 | 9.48 | 26.50 | 16.93 | 14.64 | 7.15 | 4.40 |
| 0.4 | 14.25 | 39.13 | 38.65 | 26.05 | 11.55 | 10.28 |
| 0.6 | 21.90 | 48.88 | 53.00 | 37.45 | 38.40 | 16.23 |
| 0.8 | 25.98 | 53.98 | 57.13 | 46.43 | 41.83 | 20.20 |
| 1.0 | 30.28 | 58.20 | 59.53 | 52.83 | 46.85 | 22.28 |
| 1.2 | 35.33 | 61.98 | 60.98 | 57.93 | 49.88 | 23.70 |
| 1.4 | 39.55 | 64.90 | 62.98 | 61.45 | 51.40 | 24.85 |
| 1.6 | 43.43 | 66.15 | 65.33 | 64.40 | 53.73 | 25.89 |
| 1.8 | 46.73 | 66.13 | 67.38 | 66.85 | 55.95 | 26.70 |
| 2.0 | 48.73 | 68.63 | 68.95 | 69.20 | 57.95 | 27.65 |
| *3 | 25.50 | 29.03 | 35.48 | 40.40 | 36.58 | |

*1: Electromagnet + permanent magnet
*2: Electromagnet (without magnetic members)
*3: Only permanent magnet
(1): Movable member (piece) made of Ferroperm FIG. 26 shows data indicated in Table 32 in the form of a line graph which permits the data to be readily visibly understood.

Figure 26:
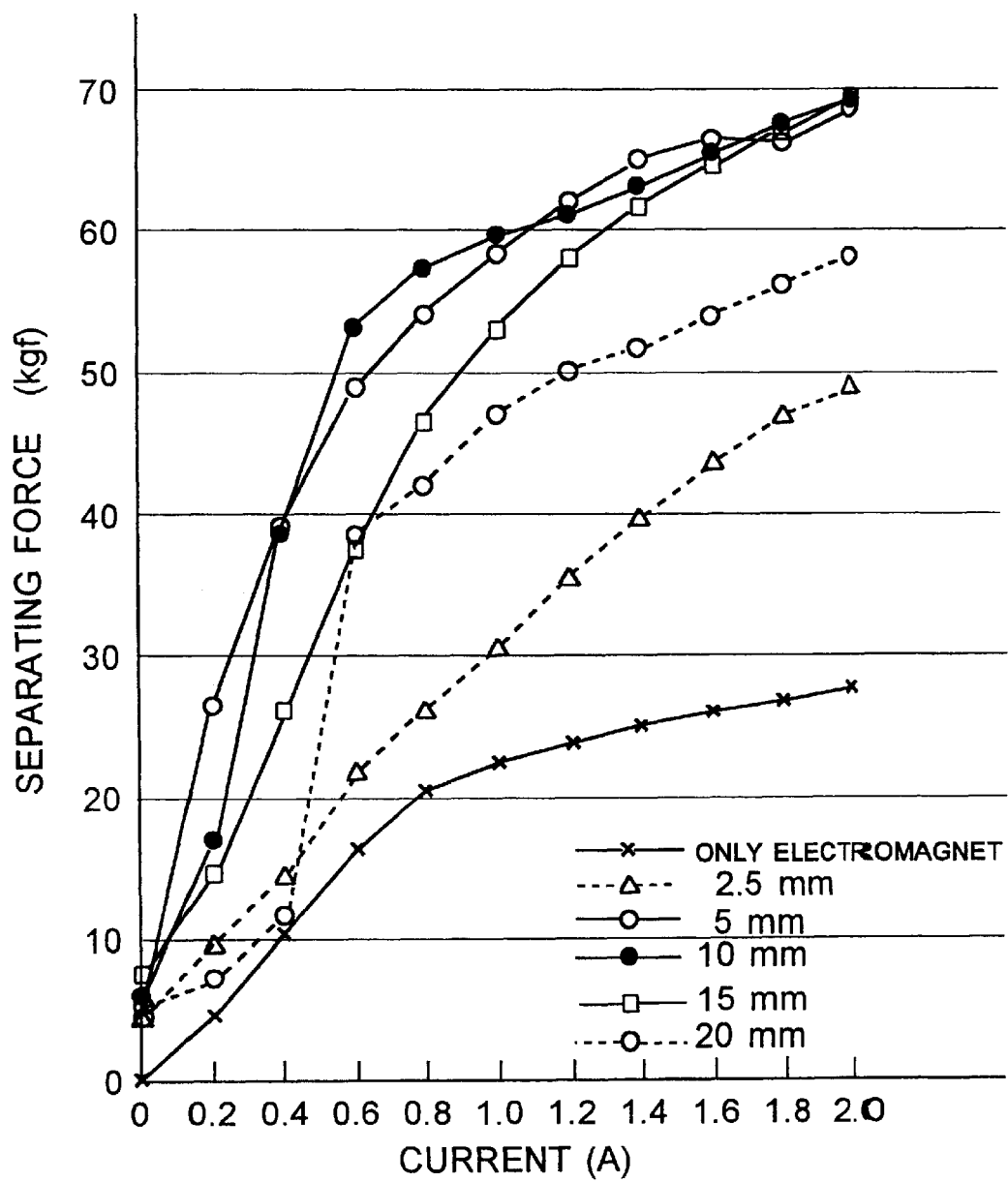
FIG. 26 is a graphical representation showing, in the form of a line graph, data in Table 10 showing results obtained in the experiments shown in FIGS. 19A to 24B.

Table 32 and FIG. 26 indicate that when the permanent magnets 72 and 74 each have a width within a range between 2.5 mm and 20 mm, the hybrid-type magnet 50 of the illustrated embodiment exhibits increased attractive force as compared with that obtained with only the electromagnet throughout a current range of 0.2 A to 2.0 A. In particular, the attractive force is remarkably increased when a width of the permanent magnets 72 and 74 is within a range between 5 mm and 15 mm. In view of such a fact, it was found that the illustrated embodiment exhibits a significant advantage when a ratio between a width of one of the permanent magnets and a sum of widths of the magnetic members is 1:1 to 1:15 and more particularly 1:1.6 to 1:7. In the second embodiment described above with reference to FIGS. 7A and 7B, an experiment as to an effect which a width of the permanent magnet produces on the separating force was not carried out. However, the above-described advantage of the illustrated embodiment would be true of the second embodiment. Also, in the illustrated embodiment, an experiment as to attractive force during sliding or passing of the magnetic member past the hybrid-type magnet 50 was not carried out. However, the above-described advantage of the second embodiment would be true of the illustrated embodiment.

Figure 28A:
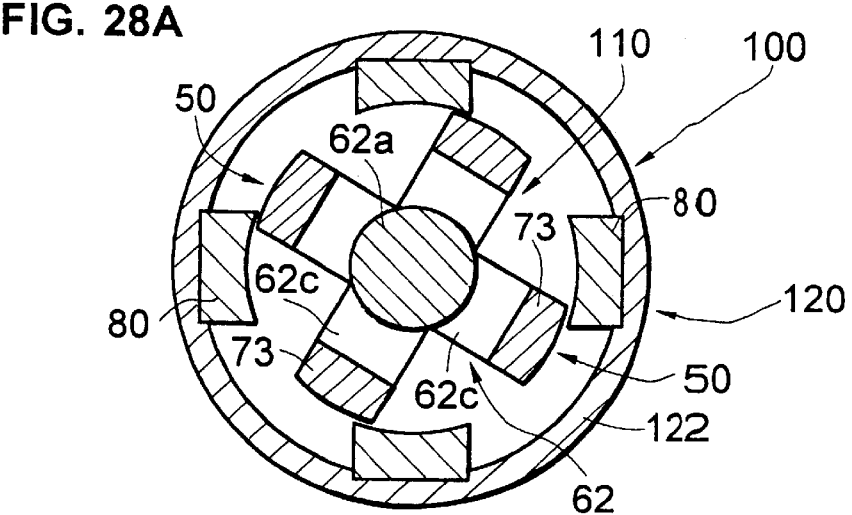
FIG. 28A is an end view taken along line 28A—28A of FIG. 27.
Figure 28B:
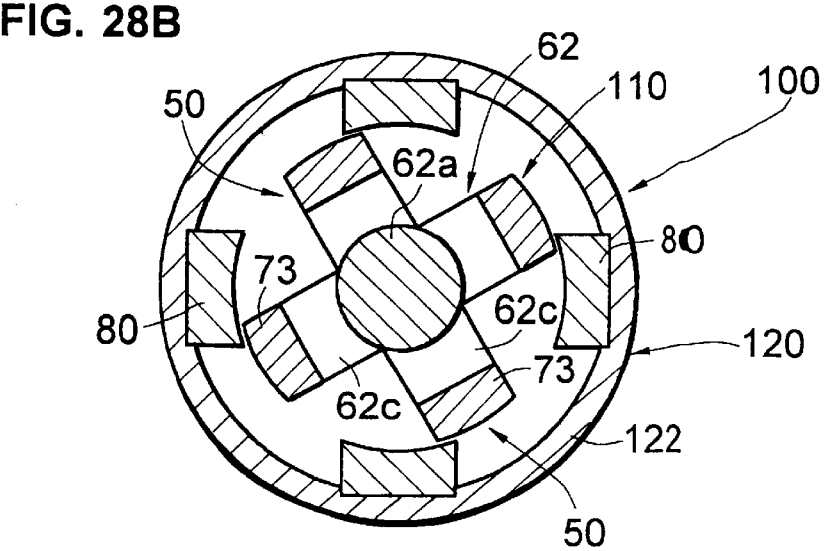
FIG. 28B is an end view taken along line 28B—28B of FIG. 27.
Figure 28C:
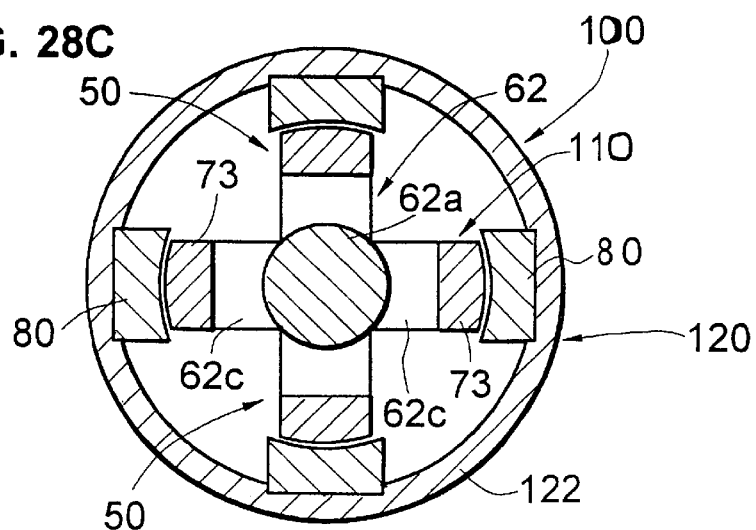
FIG. 28C is an end view taken along line 28C—28C of FIG. 27.

Referring now to FIGS. 27 to 28C, an embodiment of a stepping motor according to the present invention is illustrated. A stepping motor of the illustrated embodiment which is generally designated at reference numeral 100 generally includes a stator 110 and a rotor 120. The stator 110 includes a plurality of hybrid-type magnets 50 constructed as described above which are arranged in three stages in series to each other. The stages each include four such hybrid-type magnets 50 which are integrally combined together and arranged in such a manner that arms 62b and 62c of the four hybrid-type magnets 50 are radially extended and spaced from each other at equal angular intervals around a single common core body 62a common to cores 62 thereof, as shown in FIGS. 28A to 28C. The common core body 62a is defined by uniting core bodies of the cores 62 of the hybrid-type magnets 50 into one. In the illustrated embodiment, the arms 62b and 62c are arranged so as to be spaced from each other at angular intervals of 90 degrees. The three stages are arranged in series to each other in order at a predetermined phase difference in a vertical direction (or in a lateral direction in FIG. 27). In the illustrated embodiment, the phase difference is set to be 30 degrees. The rotor 120 includes magnetic members 80 mounted at equal angular intervals inside a rotary cylinder 122 arranged outside an engagement member 70 of each of the hybrid-type magnets 50. In the illustrated embodiment, the magnetic members 80 are arranged at angular intervals of 90 degrees. Such construction permits the stepping motor 100 to be rotated at steps of 30 degrees.

The motor 100 is substantially increased in efficiency as compared with a conventional stepping motor, as will be readily noted from the above-described advantage of the hybrid-type magnet 50. In the illustrated embodiment, the stator 110 is so constructed that the four hybrid-type magnets 50 are arranged to be radially extended and in three stages in series while defining a phase difference thereamong. Alternatively, when the stator 110 is constituted of eight such hybrid-type magnets, the stepping motor is permitted to rotate at steps of 15 degrees. An increase in the number of stages permits the stepping motor to be rotated at finer steps. Thus, the stepping motor of the illustrated embodiment utilizes permanent magnets, to thereby permit energy inputted thereto to be efficiently outputted therefrom, resulting in energy-savings.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A hybrid-type magnet comprising:

an electromagnet including a U-shaped core made of a magnetic material, said core comprising a core body having outer ends and a pair of opposing arms extending upwardly from the outer ends of said core body, wherein each said opposing arm includes an upper end having an end surface;

a bar-like engagement member comprising a permanent magnet having a direction of magnetization, said permanent magnet being disposed between magnetic members, wherein the magnetic members are closely joined to the respective end surfaces of said arms and the magnetic members define outer surfaces opposite the end surfaces of said arms, said permanent magnet being positioned between said arms of said core, wherein the end surfaces of said opposing arms extend in a direction substantially parallel with the direction of magnetization of the permanent magnet and a ratio between a width of said permanent magnet in the direction of magnetization thereof and a sum of widths of said magnetic members is within a range between 1:1 and 1:15; and an excitation coil wound on said core, wherein when current is fed to said excitation coil, it generates a magnetic flux in a direction opposite the direction of magnetization of said permanent magnet thereby generating an attractive force through the outer surfaces of the magnetic member to attract a movable member to the outer surfaces of the magnetic members.

2. A hybrid-type magnet as defined in claim 1, wherein said permanent magnet and magnetic members of said engagement member each have a cross section formed to have a rectangular shape and identical dimensions.

3. A hybrid-type magnet as defined in claim 2, wherein each of said arms of said core has an outer surface defined at a lateral end thereof; and said engagement member has end surfaces defined at opposite lateral ends thereof; and said outer surface of said arm and one of said end surfaces of said engagement member are formed so as to be flush with each other when said engagement member is closely joined to said core.

4. A hybrid-type magnet as defined in claim 2, wherein said arms of said core are each formed to have a rectangular shape in cross section.

5. A hybrid-type magnet as defined in claim 1, wherein each of said arms of said core has an outer surface defined at a lateral end thereof; and said engagement member has end surfaces defined at opposite lateral ends thereof; and said outer surface of said arm and one of said end surfaces of said engagement member are formed so as to be flush with each other when said engagement member is closely joined to said core.

6. A hybrid-type magnet as defined in claim 3, wherein said magnetic members of said engagement member each have a saturation magnetic flux density greater than that of said core.

7. A hybrid-type magnet as defined in claim 1, wherein said magnetic members of said engagement member each have a saturation magnetic flux density greater than that of said core.

8. A hybrid-type magnet as defined in claim 7, wherein said core is made of pure iron and said permanent magnet is made of neodymium.

9. A hybrid-type magnet as defined in claim 1, wherein said arms of said core are each formed to have a rectangular shape in cross section.

10. A hybrid-type magnet as defined in claim 1, wherein said core is made of pure iron and said permanent magnet is made of neodymium.

11. A hybrid-type magnet comprising:

an electromagnet including a substantially E-shaped core made of a magnetic material, said core comprising a pair of core bodies and three arms, said three arms including first and second outer arms at outer ends of said core and a central arm between said two outer arms, wherein each said arm includes an upper end having an end surface;

a bar-like engagement member comprising in series a first magnetic member, a first permanent magnet, a second magnetic member, a second permanent magnet, and a third magnetic member tightly connected to each other, wherein said first, second and third magnetic members are closely joined to the end surfaces of said respective arms and define outer surfaces opposite the end surfaces of said respective arms, said first permanent magnet being positioned between the first outer arm and the central arm and said second permanent magnet being positioned between the central arm and the second outer arm, and wherein the end surfaces of said arms extend in a direction substantially parallel to the direction of magnetization of said first and second permanent magnets, and said permanent magnets have identical widths in the direction of magnetization thereof, wherein a ratio between a sum of widths of said permanent magnets and a sum of widths of said magnetic members is within a range between 1:1 to 1:15; and excitation coils wound on a corresponding on of said core bodies, wherein when current is fed to said excitation coil, they generate a magnetic flux in a direction opposite the direction of magnetization of said permanent magnets thereby generating an attractive force through the outer surfaces of the magnetic members to attract a movable member to the outer surfaces of the magnetic members.

12. A hybrid-type magnet as defined in claim 11, wherein said permanent magnets and magnetic members of said engagement member each have a cross section formed to have a rectangular shape and identical dimensions.

13. A hybrid-type magnet as defined in claim 12, wherein each of said outer two arms of said arms of said core has an outer surface defined at a lateral end thereof; and said engagement member has end surfaces defined at opposite lateral ends thereof; and said outer surface of each of said outer two arms of said arms and one of said end surfaces of said engagement member are formed so as to be flush with each other when said engagement member is closely joined to said core.

14. A hybrid-type magnet as defined in claim 12, wherein said arms of said core are each formed to have a rectangular shape in cross section.

15. A hybrid-type magnet as defined in claim 11, wherein each of said outer two arms of said arms of said core has an outer surface defined at a lateral end thereof; and said engagement member has end surfaces defined at opposite lateral ends thereof; and said outer surface of each of said outer two arms of said arms and one of said end surfaces of said engagement member are formed so as to be flush with each other when said engagement member is closely joined to said core.

16. A hybrid-type magnet as defined in claim 15, wherein said magnetic members of said engagement member each have a saturation magnetic flux density greater than that of said core.

17. A hybrid-type magnet as defined in claim 11, wherein said magnetic members of said engagement member each have a saturation magnetic flux density greater than that of said core.

18. A hybrid-type magnet as defined in claim 17, wherein said core is made of pure iron and said permanent magnets are each made of neodymium.

19. A hybrid-type magnet as defined in claim 11, wherein said arms of said core are each formed to have a rectangular shape in cross section.

20. A hybrid-type magnet as defined in claim 11, wherein said core is made of pure iron and said permanent magnets are each made of neodymium.

21. A stepping motor comprising:

a stator; and a rotor;

said stator including a plurality of hybrid-type magnets, each said hybrid-type magnet comprising:

an electromagnet including a U-shaped core made of a magnetic material, said core comprising a core body having outer ends and a pair of opposing arms extending upwardly from the outer ends of said core body, wherein each said opposing arm includes an upper end having an end surface;

a bar-like engagement member comprising a permanent magnet having a direction of magnetization, said permanent magnet being disposed between magnetic members, wherein the magnetic members are closely joined to the respective end surfaces of said arms and define outer surfaces opposite the end surfaces of said respective arms, said permanent magnet being positioned between said arms of said core, wherein the end surfaces of said opposing arms extend in a direction substantially parallel with the direction of magnetization of the permanent magnet and a ratio between a width of said permanent magnet in the direction of magnetization thereof and a sum of widths of said magnetic members is within a range between 1:1 and 1:15; and an excitation coil wound on said core, wherein when current is fed to said excitation coil, it generates a magnetic flux in a direction opposite the direction of magnetization of said permanent magnet thereby generating an attractive force through the outer surfaces of the magnetic member to attract a movable member to the outer surfaces of the magnetic members, wherein said hybrid-type magnets are integrally combined together and arranged in such a manner that the arms are radially extended and spaced from each other at equal angular intervals around a single common core body of the cores thereof;

said rotor including magnetic members arranged at equal angular intervals outside the engagement members of said hybrid-type magnets.

22. A stepping motor as defined in claim 21, wherein a plurality of said stepping motors are arranged at a predetermined phase difference while being connected in series to each other.

23. A stepping motor comprising:

a stator; and a rotor;

said stator including a plurality of hybrid-type magnets, each said hybrid-type magnet comprising:

an electromagnet including a substantially E-shaped core made of a magnetic material, said core comprising a pair of core bodies and three arms, said three arms including first and second outer arms at outer ends of said core and a central arm between said two outer arms, wherein each said arm includes an upper end having an end surface;

a bar-like engagement member comprising in series a first magnetic member, a first permanent magnet, a second magnetic member, a second permanent magnet, and a third magnetic member tightly connected to each other, wherein said first, second and third magnetic members are closely joined to the end surfaces of said respective arms and define outer surfaces opposite the end surfaces of said respective arms, said first permanent magnet being positioned between the first outer arm and the central arm and said second permanent magnet being positioned between the central arm and the second outer arm, wherein the end surfaces of said arms extend in a direction substantially parallel to the direction of magnetization of said first and second permanent magnets, and said permanent magnets have identical widths in the direction of magnetization thereof, wherein a ratio between a sum of widths of said permanent magnets and a sum of widths of said magnetic members is within a range between 1:1 to 1:15; and excitation coils wound on a corresponding on of said core bodies, wherein when current is fed to said excitation coils, they generate a magnetic flux in a direction opposite the direction of magnetization of said permanent magnets thereby generating an attractive force through the outer surfaces of the magnetic members to attract a movable member to the outer surfaces of the magnetic members, wherein said hybrid-type magnets are integrally combined together and arranged in such a manner that the arms are radially extended and spaced from each other at equal angular intervals around a single common core body of the cores thereof;

said rotor including magnetic members arranged at equal angular intervals outside the engagement members of said hybrid-type magnets.

24. A stepping motor as defined in claim 23, wherein a plurality of said stepping motors are arranged at a predetermined phase difference while being connected in series to each other.

* * * * *

UNITED STATES PATENT AND TRADEMARK OFFICE
CERTIFICATE OF CORRECTION

PATENT NO. : 6,369,479 B1
DATED : April 9, 2002
INVENTOR(S) : Yasuzumi Ochiai, Yoshitake Nishi, Kazuya Oguri, Sanshiro Ogino and Hiroyuki Makabe It is certified that error appears in the above-identified patent and that said Letters Patent is hereby corrected as shown below:

<u>Column 1,</u>
Line 30 after "in" insert -- the --.
Line 30, after "magnetic" insert -- field --.

<u>Column 4,</u>
Line 17, "Shown" should read -- shown --.

<u>Column 23,</u>
Line 6, "63b" should read -- 62b --.

<u>Column 27,</u>
Line 21, "on" (second occurrence) should read -- one --.

<u>Column 29,</u>
Line 20, "on" (second occurrence) should read -- one --.

Signed and Sealed this

Fifteenth Day of October, 2002

*Attest:*

*Attesting Officer*

JAMES E. ROGAN
*Director of the United States Patent and Trademark Office*